(12) United States Patent
Kurosawa

(10) Patent No.: US 8,312,133 B2
(45) Date of Patent: Nov. 13, 2012

(54) IMAGE DISTRIBUTION SYSTEM AND THE CONTROL METHOD THEREFOR

(75) Inventor: Takahiro Kurosawa, Kunitachi (JP)

(73) Assignee: Canon Kabushiki Kaisha (JP)

(*) Notice: Subject to any disclaimer, the term of this patent is extended or adjusted under 35 U.S.C. 154(b) by 848 days.

(21) Appl. No.: 11/235,887

(22) Filed: Sep. 27, 2005

(65) Prior Publication Data

US 2006/0070111 A1    Mar. 30, 2006

(30) Foreign Application Priority Data

Sep. 28, 2004   (JP) ................................ 2004-282479

(51) Int. Cl.
*G06F 15/173* (2006.01)
*G06F 3/00* (2006.01)
*G06F 15/177* (2006.01)
*H04N 7/18* (2006.01)
*H04N 5/225* (2006.01)
*H04N 5/232* (2006.01)

(52) U.S. Cl. ..... 709/224; 709/223; 348/143; 348/207.1; 348/207.11; 348/211.4; 348/211.6; 348/211.8; 348/211.13; 715/716; 715/718; 715/73; 715/734; 715/735; 715/736; 715/746

(58) Field of Classification Search .......... 709/223–224; 348/143, 211.99, 201.1, 201.11, 211.4, 211.6, 348/211.8, 211.13; 715/788, 800, 716, 718, 715/733–736, 746; 725/105

See application file for complete search history.

(56) References Cited

U.S. PATENT DOCUMENTS

| | | | | |
|---|---|---|---|---|
| 6,011,550 A * | 1/2000 | Capps et al. | ................... | 715/788 |
| 6,108,035 A * | 8/2000 | Parker et al. | ................... | 348/169 |
| 6,133,941 A * | 10/2000 | Ono | .......................... | 348/14.05 |
| 6,166,729 A * | 12/2000 | Acosta et al. | ................. | 715/719 |
| 6,208,379 B1 * | 3/2001 | Oya et al. | ................. | 348/211.11 |
| 6,215,515 B1 * | 4/2001 | Voois et al. | ................ | 348/14.01 |
| 6,469,737 B1 * | 10/2002 | Igarashi et al. | ............ | 348/211.3 |
| 6,529,234 B2 * | 3/2003 | Urisaka et al. | ........... | 348/211.99 |
| 6,698,021 B1 * | 2/2004 | Amini et al. | ................... | 725/105 |
| 6,769,131 B1 * | 7/2004 | Tanaka et al. | ................. | 725/105 |
| 7,283,161 B2 * | 10/2007 | Someya et al. | ............ | 348/211.9 |
| 7,411,610 B2 * | 8/2008 | Doyle | ........................ | 348/211.8 |

(Continued)

FOREIGN PATENT DOCUMENTS

JP    2000-175179 A    6/2000

OTHER PUBLICATIONS

"RTP: A Transport Protocol for Real-Time Applications"; Schulzrinne et al.; Lawrence Berkley National Laboratory, Jan. 1996; retrieved from the Internet May 13, 2008; (http://tools.ietf.org/html/rfc1889); IETF RFC 1889; pp. 1-69.

*Primary Examiner* — Catherine Thiaw

(74) *Attorney, Agent, or Firm* — Rossi, Kimms & McDowell LLP

(57) ABSTRACT

An image distribution system, which is connected via a network with a client for displaying an image picked up by an image sensing unit of a server, judges a communication status of the network. In addition, in accordance with a result of the judgment, the image distribution system changes a user interface for selecting a function request command for the image sensing unit of the imaging apparatus.

9 Claims, 18 Drawing Sheets

U.S. PATENT DOCUMENTS

| | | | |
|---|---|---|---|
| 2001/0024233 A1* | 9/2001 | Urisaka et al. | 348/213 |
| 2002/0018123 A1* | 2/2002 | Suzuki et al. | 348/211 |
| 2002/0103894 A1* | 8/2002 | Tanaka | 709/224 |
| 2002/0135677 A1* | 9/2002 | Noro et al. | 348/143 |
| 2003/0058255 A1* | 3/2003 | Yamagishi | 345/619 |
| 2003/0103075 A1* | 6/2003 | Rosselot | 345/717 |
| 2003/0206239 A1* | 11/2003 | Battles | 348/333.02 |
| 2004/0218065 A1* | 11/2004 | Schinner | 348/231.6 |
| 2004/0264375 A1* | 12/2004 | Kim | 370/232 |
| 2004/0268263 A1* | 12/2004 | Van Dok et al. | 715/733 |
| 2004/0268267 A1* | 12/2004 | Moravcsik | 715/821 |
| 2005/0015719 A1* | 1/2005 | Marchon et al. | 715/513 |
| 2005/0078180 A1* | 4/2005 | Nakamura | 348/143 |
| 2005/0128314 A1* | 6/2005 | Ishino | 348/222.1 |
| 2005/0248663 A1* | 11/2005 | Owens et al. | 348/222.1 |
| 2006/0244838 A1* | 11/2006 | Arbogast | 348/211.4 |

* cited by examiner

IMAGE DISTRIBUTION SYSTEM AND THE CONTROL METHOD THEREFOR

BACKGROUND OF THE INVENTION

1. Field of the Invention

The present invention relates to an imaging apparatus, a video display apparatus for receiving and displaying a video signal picked up by the imaging apparatus, a video distribution system in which the imaging apparatus and the video display apparatus are mutually connected via a network, and a control method therefor.

2. Related Background Art

Already established is a technology for distributing a live video taken by a camera via the Internet and the like and instructing the camera for a camera setting and a camera operation such as panning, tilting, zooming, and backlight compensation for image taking.

When the controllable camera serviced on the Internet is operated by a user, there is a case where a camera control with a good response cannot be provided because a state of delay and jitter in communication is different depending on a network route to be used and a network status.

SUMMARY OF THE INVENTION

The present invention is provided in consideration of the above problem; and an aspect of the present invention is to provide a video distribution system in which an operability of an imaging device by a user is improved by changing an issuable function request command for controlling the operation of an image sensing unit in accordance with a communication status via a network and a control method therefor.

In order to achieve the above aspect, in one embodiment of the present invention, an image distribution system, which is connected via a network with a client device for displaying an image picked up by an image sensing unit of a server, changes a user interface for controlling the image sensing unit on the basis of a communication status of the network.

Further aspects of the present invention will become apparent from the following detailed description of exemplary embodiments with reference to the attached drawings.

DESCRIPTION OF THE PREFERRED EMBODIMENTS

Figure 1:
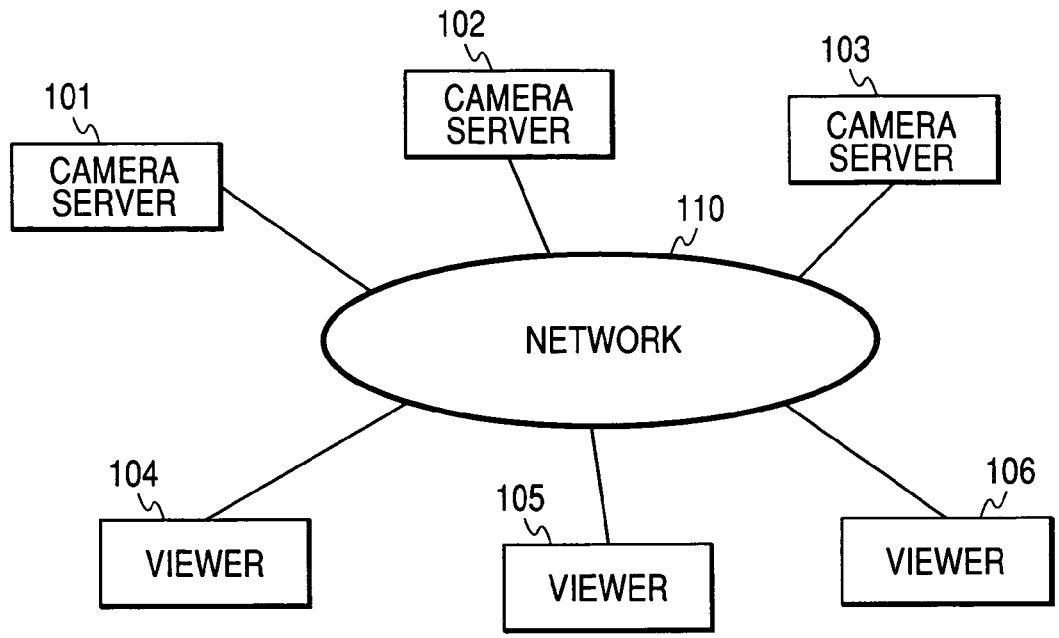
FIG. 1 is a view showing a configuration of a video distribution system according to an embodiment of the present invention.

An embodiment of the present invention is explained hereinafter.

To begin with, in this embodiment, technologies as described below are used to judge a status of a network and to exchange capability information of a device.

(NTP)

For example, a network time protocol (NTP; RFC-1305) is utilized; and a simple NTP (SNTP; RFC-1769) is also utilized as a simple version of the NTP. A time synchronization system by the NTP includes a group of servers of a hierarchy structure and a terminal client. In the time synchronization system, time information is transmitted from a higher server which has the accurate time information to a lower server; and then the client device refers to the time information. In ordinary cases, the highest server of the hierarchy of the NTP retains accurate time information by using a time source of a high accuracy such as an atomic clock. In transmitting the time information to the lower server, the highest server of the hierarchy of the NTP, considering a delay and jitter (unevenness) in a network, carries out a correction so as to reduce an influence exerted by the delay and the jitter. In addition, the referent of the time is not limited to one; it is possible to determine the time based on time information obtained from a plurality of the referents. With the above configuration, it is possible to synchronize the time of devices connected to the network with high accuracy.

(RTP)

For a communication procedure for streaming media such as a video and a voice, substantially in real time, a realtime transport protocol (RTP) is used. The RTP is designed attaching importance to real-timeness. Therefore, in ordinary cases, the RTP itself does not take countermeasures against packet losses nor assure a transmission time. In addition, RTP communication is, ordinarily, used together with an RTP control protocol (RTCP). By a reporting function (sender report and receiver report) of the RTCP, a sender server grasps an effective bandwidth, a delay time, and the like. The sender server performs transmission by the RTP while adjusting a quality of media data in accordance with a status of the communication which has been reported. Note that detailed specifications of RTP and RTCP are described in IETF RFC 1889 "RTP: A Transport Protocol for Real-Time Applications" (January 1996). In addition, these protocol specifications are adopted for Quick Time and Real Player, and the like. In the specifications, examples of method of computation of a network delay and jitter (jitter in an interval of packet arrivals: hereinafter referred to simply as "jitter") are expressed. The examples of the computation method are as shown below.

(1) Example of Computation in the Case of Network Delay:

in a case where an NTP synchronization between a transmission terminal and a reception terminal is reliable:

$$delay=TA-(LSR+DLSR);$$

in a case where the NTP synchronization cannot be utilized, an approximate value is:

$$delay=(elapsed-DLSR)/2;$$

where TA is a time at which the server receives the receiver report; LSR is a time at which the client receives the sender report; DLSR is a time period from the time at which the client receives the sender report to the time at which the client transmits the receiver report; and "elapsed" is a time period from the time at which the server sends the sender report to the time at which the server received the receiver report.

(2) Example of Computation of Jitter

Momentary jitter value: where $S(i)$ is an i-th transmission time; and $R(i)$ is an i-th receiving time, $$Jitter(i)=(R(i+1)-R(i))-(S(i+1)-S(i))$$

Accumulated value of an average jitter (Jitter_ave):

$$Jitter\_ave=Jitter\_ave+(|Jitter(i)|-Jitter\_ave)/16.$$

(Network Interconnection Technology)

A technology for interconnecting the devices connected to the network has become widespread. For example, universal plug and play (UPnP) proposed by Microsoft Corporation (United States) in 1999, is thereafter being examined in the UPnP forum. The UPnP provides that characteristics and capabilities of mutual devices are recognized through the steps of (1) addressing; (2) discovery; and (3) description (capability description), to carry out (4) a control; (5) an eventing; and (6) a presentation. The UPnP also provides a form of description based on XML for carrying out capability description in the description step and a data format based on a simple object access protocol (SOAP) for sending and receiving of information when the control and the eventing are carried out; thus the UPnP is intended for establishing an interconnection capability not dependent on a specific manufacturer or an architecture.

Note that a principal objective of the interconnection capability in the UPnP is to reduce settings by a user to a minimum, by exchanging capability descriptions of mutual devices in a description step and by adjusting the operation and the state in accordance with the capability of a device at the other end in the following steps such as the control step or the eventing step.

(Capability Exchange Technology)

A technology for exchanging the capability of the network devices or a software program on the network devices among the network devices has become widespread. For example, in the universal plug and play (UPnP; http://www.upnp.org/) mentioned above, it is provided that in the description step, the capability description is exchanged among the devices discovered in the discovery step which is the step immediately prior to the description step.

Under the provision of the UPnP, as the device information exchanged in the description step, a device description which is related to the device main body and a service description which is related to functions provided by the devices are mentioned; and the descriptions are described in an XML format. The device description is configured by a physical property; a logical property; and an UI property. Besides, the service description is configured by effective action information and state information. The control step, the eventing step, and the presentation step, which are to be taken after the description step, are properly carried out on the basis of the capability exchanged in the description step.

First Embodiment

In a first embodiment of the present invention, an example is explained in which in a viewer disposed on the network, an operation capability of a camera provided by a camera server is switched in accordance with a network status. The viewer according to the first embodiment is characterized in that the viewer is provided with an extended camera control function which enables a control of the camera having a large granularity; and that the viewer provides coarse granularity camera control, instead of fine granularity camera control, in accordance with the network status.

With this characteristic, in a case of, for example, a cellular phone network where the large network delay occurs and a difference between the camera control and a camera video occurs, an operability of a user is improved and stress on a user is reduced.

Note that in the first embodiment, the fine granularity camera control is a primitive camera control such as panning, tilting, and zooming in a camera server or a network camera, while the coarse granularity camera control of the first embodiment is explained as a "preset selection" or as the combined camera control such as a "preset patrol", an "autopan", and a "whole view field scan" by an automatic generation of a camera control command.

The "preset patrol" means the camera control in which a plurality of preset positions set in the camera server is automatically patrolled. The "autopan" means the camera control in which panning control is automatically carried out from one end to the other end of the lateral limit of panning capability of the camera server. The "whole view field scan" means the camera control in which the whole view of the camera server is sequentially scanned at a preset zoom magnification and a panoramic image is updated on the camera server side. In addition, the speed of the panning and the scanning in the camera control are previously set in the camera server.

FIG. 1 is a view showing a configuration of the image distribution system according to the first embodiment.

In FIG. 1, a plurality of camera servers 101 through 103 and a plurality of viewers 104 through 106 are connected to a network 110. Note that a number of the camera servers and a number of the viewers are described as examples and are not limited to these numbers. In addition, the function of each of the servers and the function of each of the viewers may be different from one another or may be the same as one another. Hereinbelow, to simplify the explanation, the explanation is made with the camera server 101 and the viewer 104 as the object of the explanation.

A video distribution request is sent to the camera server 101 from the viewer 104 via the network 110. When the video distribution request is received, a video data is distributed from the camera server 101 to the viewer 104. As a result, it is possible to browse the camera video by the viewer 104. Also, the camera control command is sent from the viewer 104 to the camera server 101, thereby enabling the camera control such as zooming, panning, and tilting.

Note that the network 110 in FIG. 1 may be the Internet or an intranet which is operated within a company or an organization.

Figure 2:
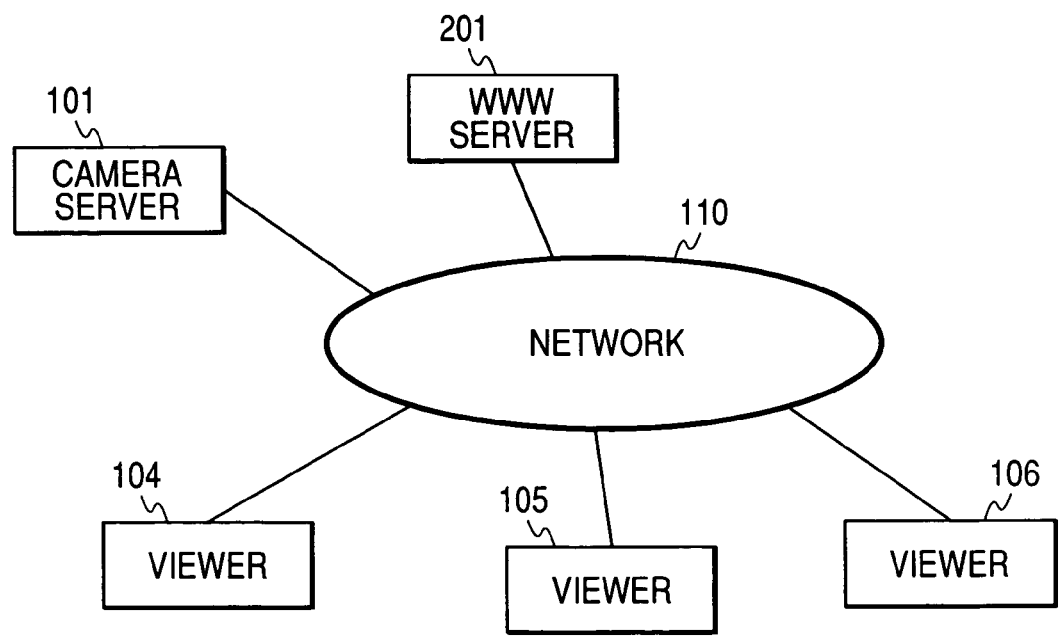
FIG. 2 is a view showing a configuration of a distribution system in which a web technology is additionally used.

FIG. 2 is a view showing a configuration of a distribution system in which a web technology is additionally used.

A WWW server 201 which is connected to the network 110 is necessary in this distribution system. In web page data of the WWW server 201, a link is provided indicating by which address the viewer 104 can be connected to the camera server 101. Accordingly, the viewer 104 can access the address to be connected to the desired camera server 101.

Figure 3:
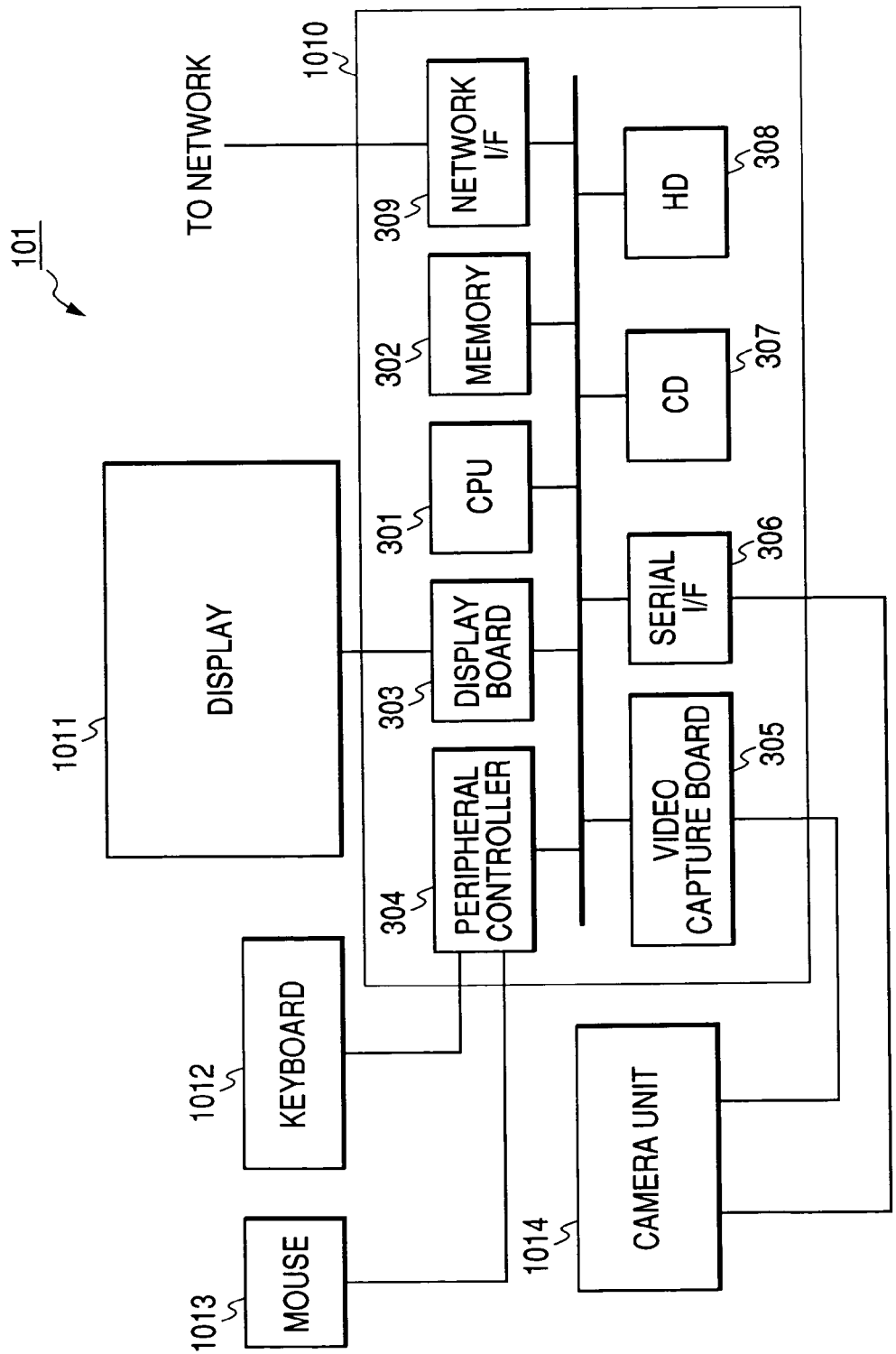
FIG. 3 is a block diagram showing an example of a hardware configuration of a camera server according to this embodiment.

FIG. 3 is a block diagram showing an example of a hardware configuration of the camera server 101 according to this embodiment.

The camera server 101 is mainly configured by a computer (PC) terminal device 1011 and a camera unit 1014 for actually carrying out the imaging. The computer device 1011 includes a hard disk (HD) 308 which stores a program; a CD drive 307 which is used when, for example, the program is installed in the hard disk 308; a CPU 301 for controlling the whole operation of the camera server 101; a memory 302 to which the program executed by the CPU 301 is loaded; a display board 303 which controls the display on a display section (display) 1011 such as a liquid crystal display, and a CRT display; a video capture board 305 which captures video data from a camera unit 1014; a serial I/F 306 for sending the command to the camera unit 1014; a network I/F 309 for connecting to the network 110; and a peripheral controller 304 for controlling a keyboard 1012 and a mouse 1013. The memory 302 provides a work area for temporarily storing various kinds of data at the time of the control by the CPU 301.

Note that the camera server 101 may install the camera unit 1014 therein. In this case, the configuration may not include the peripheral controller 304, the display board 303, and the CD drive 307.

Figure 4:
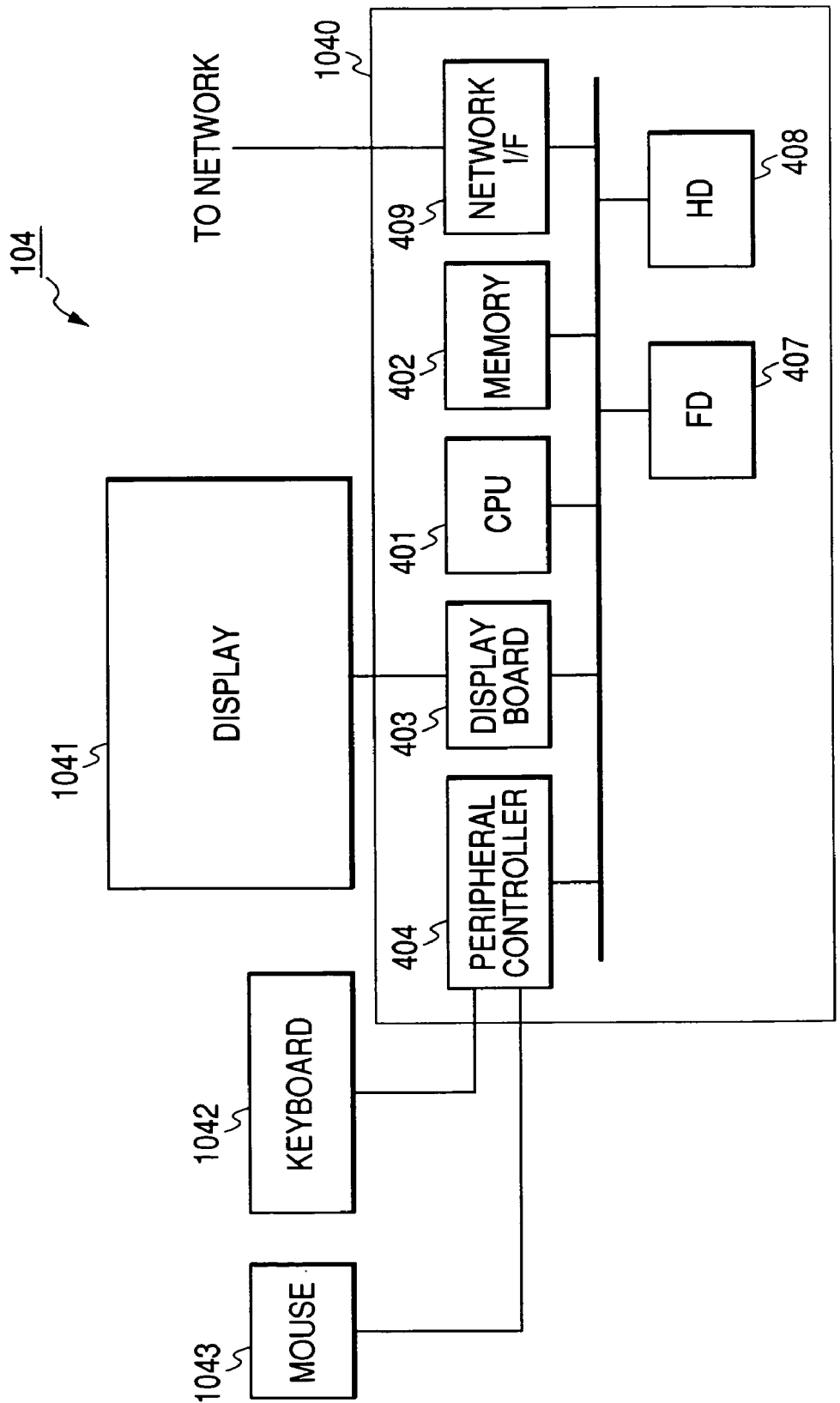
FIG. 4 is a block diagram showing an example of a hardware configuration of a viewer (client) according to this embodiment.

FIG. 4 is a block diagram showing an example of a hardware configuration of the viewer (client) 104 according to the first embodiment.

The viewer 104 is configured by a typical computer (PC) terminal device 1040. More specifically, the viewer 104 includes an HD 408 and a memory 402 which store the program; a network I/F 409 for connecting to the network 110; a CPU 401 which executes various kinds of processing in accordance with the program stored in the memory 402; and an FD/CD drive 407 for installing the program from a medium to the HD 408 or for loading the program to the memory 402. In addition, the viewer 104 is also provided with a display section (display) 1041 for displaying the video and the like received from the camera server 101; a keyboard 1042; and a mouse 1043. A display board 403 controls a display controller for controlling the display on the display section 1041; and a peripheral controller 404 controls the keyboard 1042 and the mouse 1043.

Figure 5:
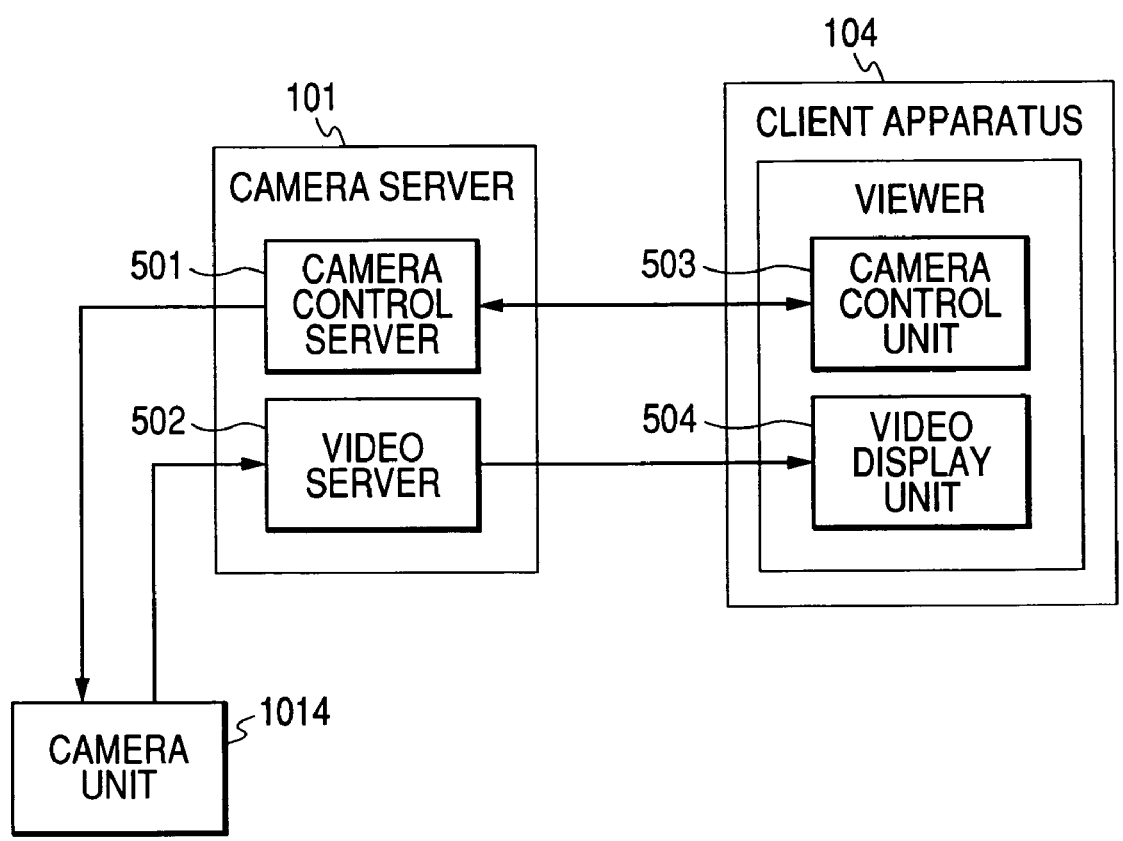
FIG. 5 is a view explaining a configuration of a program in the video distribution system (server client system) according to this embodiment.

FIG. 5 is a view explaining a configuration of the program in the video distribution system (server client system) according to the first embodiment.

In a program module of the camera server 101, two modules, namely, a camera control server 501 for controlling the camera unit 1014 and a video server 502 for controlling a delivery of the video from the camera unit 1014. Likewise, in a program module of the viewer 104, a camera control unit 503 which corresponds to a command for the camera control and a notification of the status; and a video display unit 504 for displaying the video which is received from the camera server 101.

In the viewer 104, the camera control unit 503 recognizes a menipulation by a user through the keyboard 1042 and the mouse 1043 of the viewer 104. If the operation by the user is for controlling the operation of the camera unit 1014, the camera control unit 503 creates a command corresponding thereto and transmits the created command to the camera server 101. In addition, the video display unit 504 receives a video signal from the camera server 101 and displays the received video signal to the display section 1041.

Figure 6:
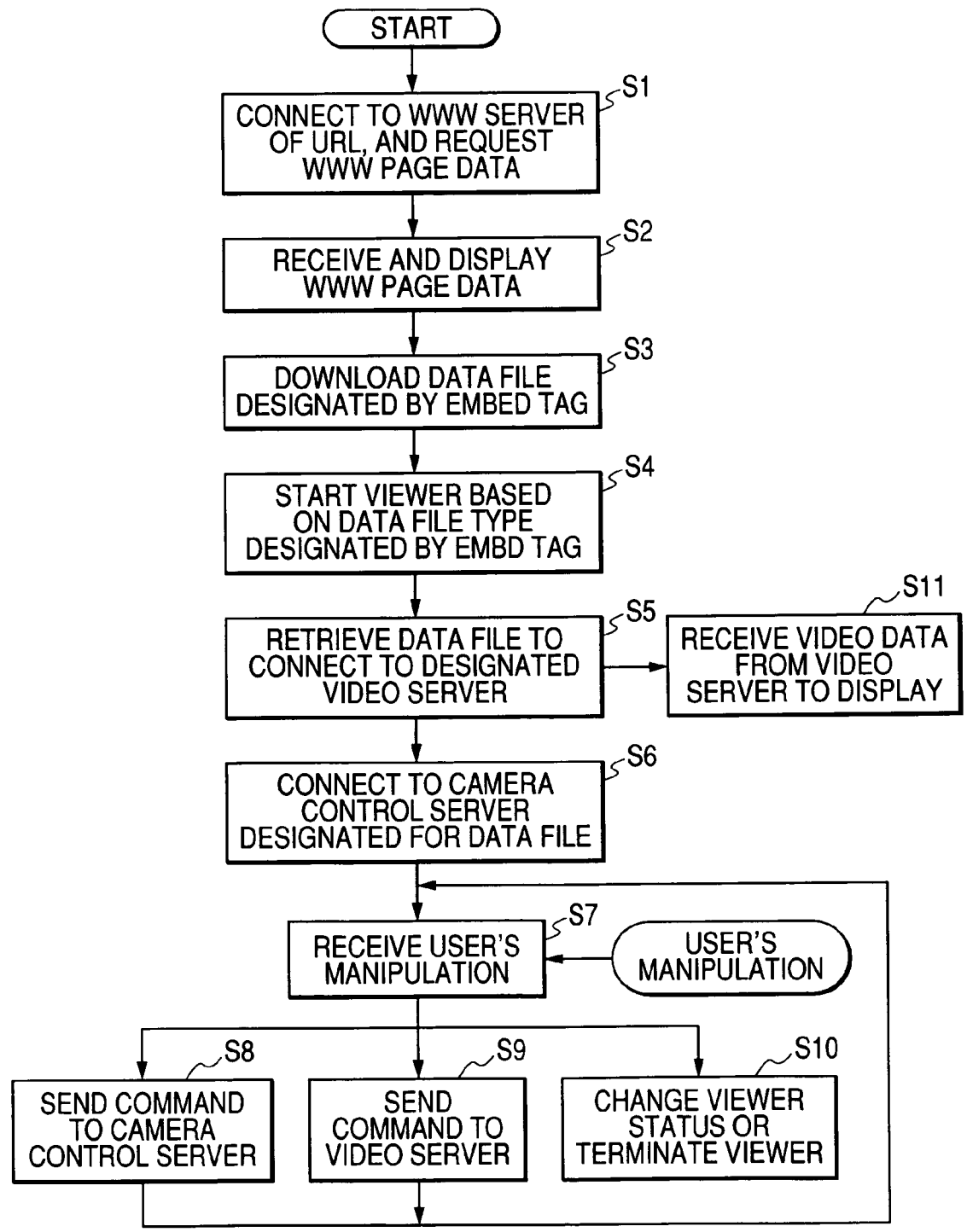
FIG. 6 is a flow chart showing a flow of a processing in the viewer according to this embodiment.

FIG. 6 is a flow chart showing a flow of a processing in the viewer 104 according to the first embodiment. The program which executes the processing is stored in the memory 402 and is executed under control of the CPU 401.

First, in step S1, the CPU 401 connects to the WWW server 201 corresponding to the URL indicated by a web browser which is application software of the viewer 104. Then, the CPU 401 make a request of the WWW server 201 for web page data described in the HTML format. Next, in step S2, the CPU 401 receives the web page data from the WWW server 201 and displays the received web page data on the display section 1041 through the web browser. The web page data received here includes an "embed" tag or a hyper link as described below which indicates information for connecting to the camera server 101 by activating the memory 104 of the image distribution system.

<embed src="camera1.wvp" width=480 height=320>

The web browser, further in step S3, accesses to the WWW server 201 for a data file designated by the embed tag (in the example as mentioned above, the "camara1.wvp" file), and downloads the designated data file to the memory 402 of the viewer 104. Next, in step S4, the CPU 401 starts a program corresponding to an extension of the data file, namely, a viewer program of the image distribution system.

On the basis of the viewer program, the CPU 401, in step S5, reads the data file downloaded to the memory 402, and connects to a video server 502 in accordance with information, which is described in the data file, of an address and a connection port of the video server 502 which configures the camera server 101. At this time, an operation program for carrying out the processings after connection processing (for a method of implementing the operation program, thread or a process is activated) is activated; and on the basis of the operation program, the CPU 401 repeats a processing of step S11 until the processing is ended, and receives the video data from the video server 502 every time the video data arrives, and displays the video data on the display section 1041 (the video data is displayed by the video display unit 504).

The processing then proceeds from step S5 to step S6. In step S6, on the basis of a main program, the CPU 401 connects to the camera control server 501 in accordance with the information, which are described in the downloaded data file, of an address and a connection port of the camera control server 501. Hereafter, the CPU 401 receives an operation request from the user (the operation request is received by the camera control unit 503), and continues to a main loop for carrying out the processing.

In step S7, the CPU 401 receives the manipulation by the user inputted by using the keyboard 1042 and the mouse 1043, and determines whether the manipulation by the user is the operation related to the camera control, to the video server 502, or for changing the state of the viewer 104.

In a case where the manipulation by the user is the operation related to the camera control, the processing proceeds to step S8. In step S8, the CPU 401 issues a command for operation of the camera server 101 to the camera control server 501 of the camera server 101. In a case where the manipulation by the user is determined to be the operation related to the video server 502 in step S7, the processing proceeds to step S9, in which the command is issued to the video server 502. Further, in a case where the manipulation by the user is the operation for changing the state of the viewer 104 (for example, changing a display size), the processing proceeds to step S10, in which the state of the viewer 10 is updated in accordance with the manipulation instruction by the user.

Further, in a case where the manipulation by the user is an end instruction operation, the CPU 401 sequentially ends each program related to the operation of the viewer 104. When the processing of step S8 through step S10 is completed, the processing returns to step S7 to wait for the user to input the manipulation for next time.

Note that the updating of an inside state of the viewer 104 of step S10 includes control capability information of the camera exhibited by the camera control server 501. When the description of the camera control capability proposed is updated, the content of the update is reflected in a UI display in the viewer 104.

Figure 7:
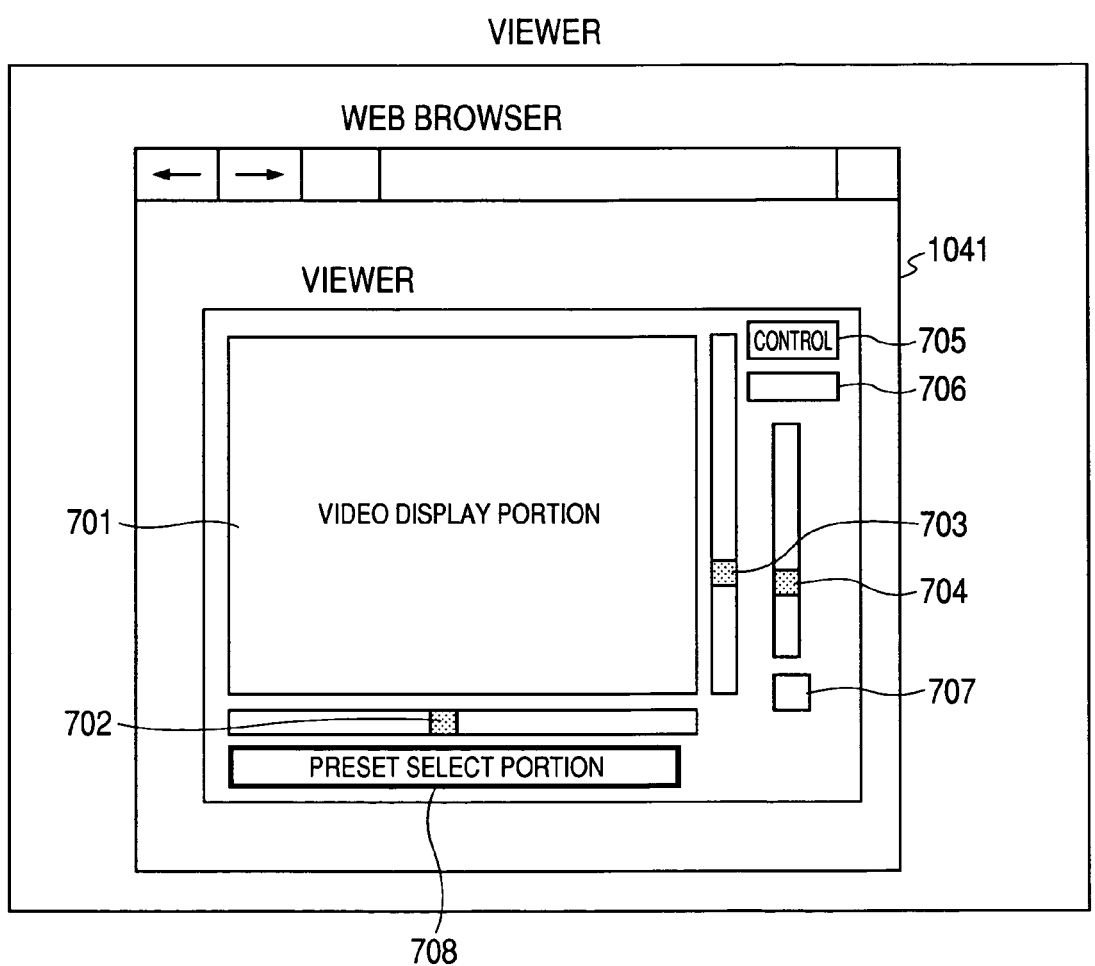
FIG. 7 is a view showing an example of a screen displayed on a display section of the viewer according to this embodiment.

FIG. 7 is a view showing a screen 104 for displaying the video from the camera server 101, which is displayed on the display section 1041 of the viewer 104 according to the first embodiment.

Here, the primitive camera control capabilities such as panning, tilting, and zooming are shown, and an window through which each operation can be carried out by sliders 702 through 704 is shown in FIG. 7.

The screen 104 is displayed by a viewer program which is one of the web browser programs. More specifically, a video display portion 701 displays the video picked up by the camera. A scroll bar 702 is for panning (horizontal swing of a camera). A scroll bar 703 is for tilting (vertical swing of a camera). A scroll bar 704 is for zooming. A button 705 is used for requesting a camera control right. A region 706 displays the state of the camera control right. A button 707 is for compensating a backlight. A preset select portion 708 is a button for displaying the window for selecting the preset which is set for the camera server 101.

The video data received in step S11 of FIG. 6 is displayed on a video display portion 701. The instruction issued by means of scroll bars 702 through 704 or the buttons 705, 707, and 708 is received in step S7; processed in steps S8 through S10; and then sent to the camera control server 501 in the camera server 101.

Figure 8:
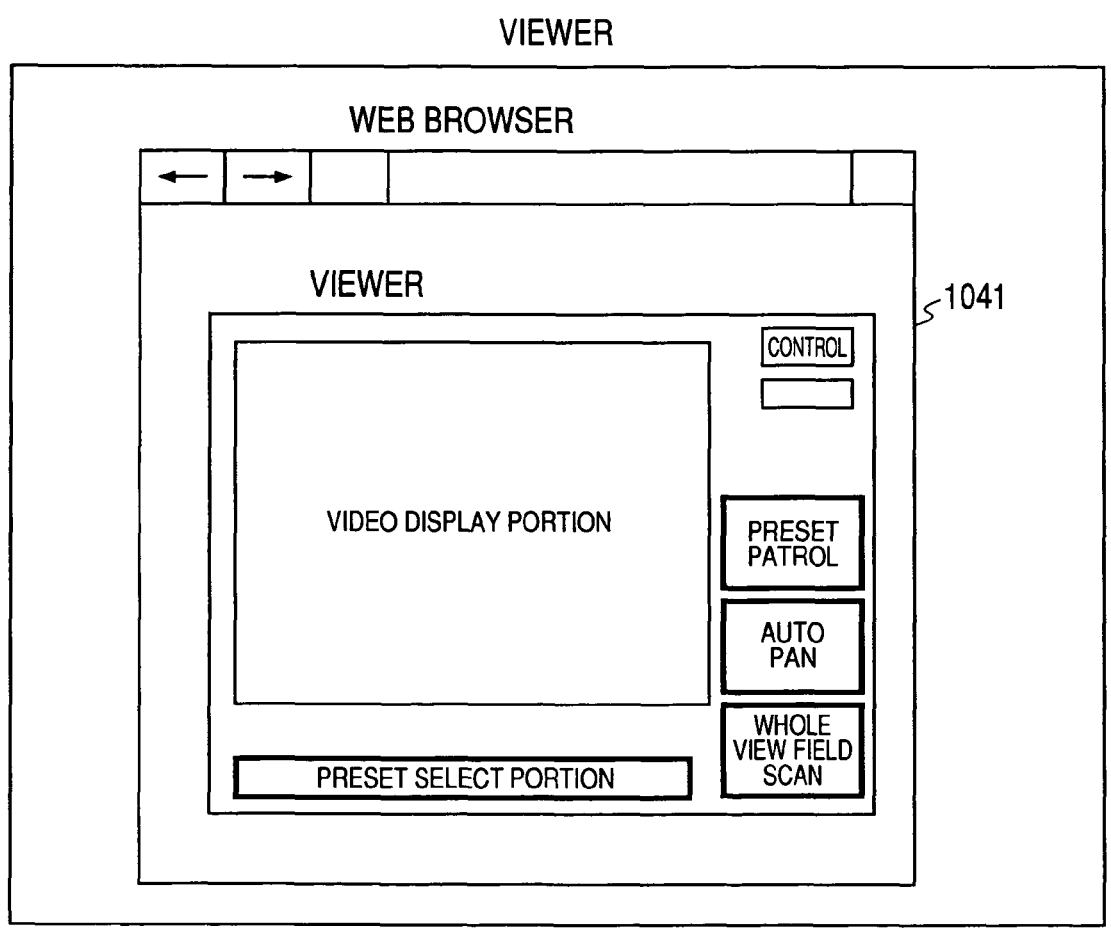
FIG. 8 is a view showing another example of a screen displayed on a display section of the viewer according to this embodiment.

FIG. 8 shows an example of another screen for displaying the video from the camera server, which is displayed on the display section 1041 of the viewer 104 according to the first embodiment. In FIG. 8, the primitive camera control capability is limited. Accordingly, only a user interface (GUI) for the coarse granularity camera control (the "preset patrol", the "autopan", and the "whole view field scan" mentioned above) is shown. Therefore, in this case, as shown in FIG. 8, only restricted operation components which do not include the sliders 702 through 704 as shown in FIG. 7.

In issuing the command to the camera server 101 in step S8, the camera control command is issued in view of the camera control capability proposed by the camera server 101. Therefore, transmission of a useless command such as a command requesting a function which is not included by the camera server 101 at this point of time can be avoided. Accordingly, a congestion of the communication of the network 110 can be alleviated. In addition, in issuing the command, status information (reception information) of the network 110 such as delay or jitter in the network 110 are computed based on a time stamp appended to the latest video data obtained in step S11, and a result of the computation is appended to the camera control command. Besides, in video request in step S11, similar status information (reception information) of the network 110 is appended.

Figure 9:
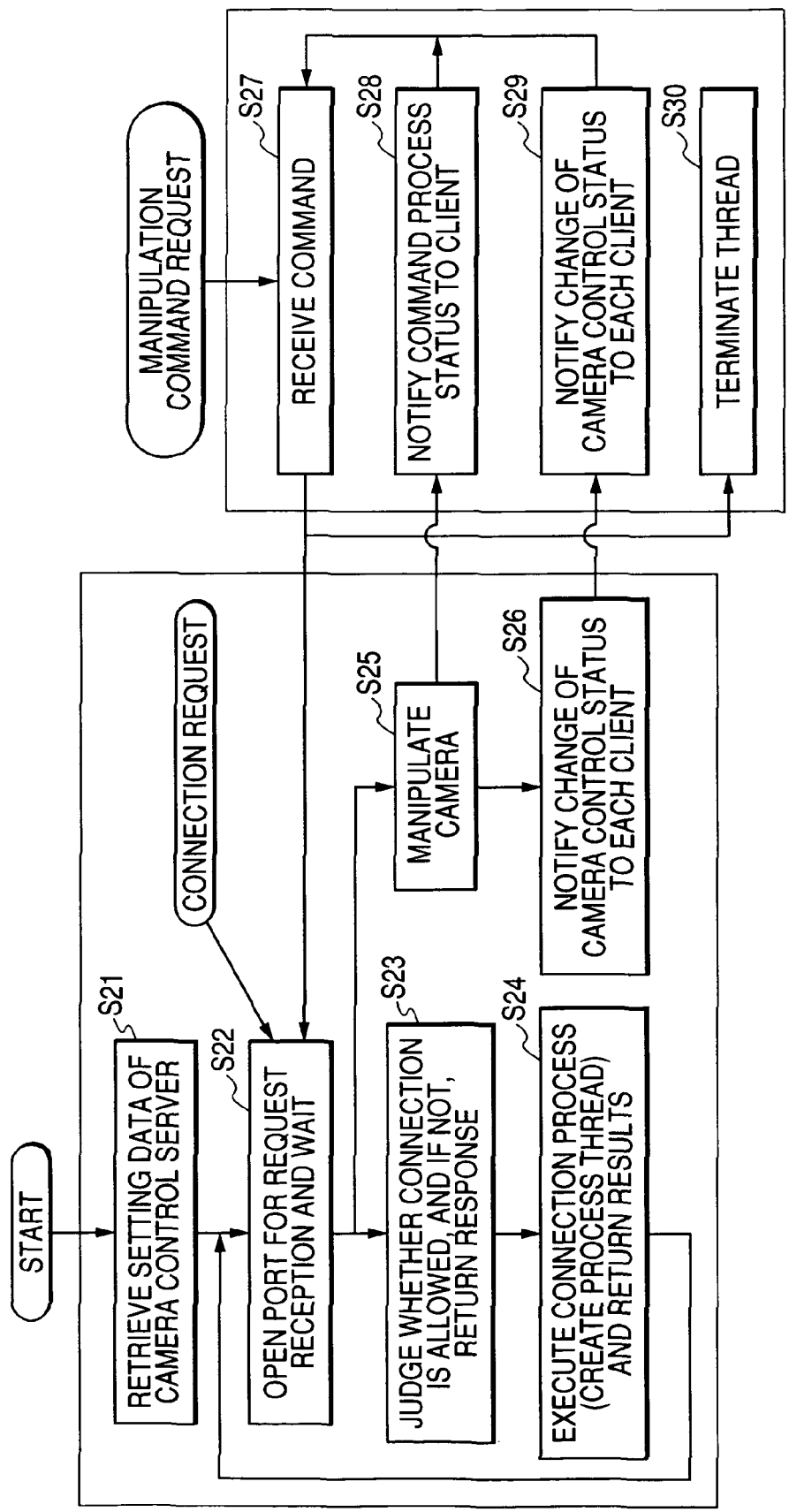
FIG. 9 is a flow chart explaining an operation of a camera control server of a camera server according to this embodiment.

FIG. 9 is a flow chart explaining an operation of the camera control server 501 of the camera server 101 according to the first embodiment. The program which executes the processing is stored in the memory 302 of the camera server 101, and is executed under control of the CPU 301.

The camera control server 501, first, at the time of activation thereof, in step S21, retrieves an function setting information of the camera control server 501 from a specific file (a system database such as a registry, depending on the kind of an OS); and starts the operation on the basis of the function setting information.

A main program of the camera control server 501 opens a port which receives the request from the program of the viewer 104 which is a client. Subsequently, in step S22, enters a state in which the request is received. When the request (a connection request or an manipulation command request) is received, and if the request is the connection request, the processing proceeds to step S23 to determine whether the connection is available or not.

If the connection is not available, an error code to the effect that the connection is rejected is outputted and the processing returns to step S22. On the other hand, if the connection is available, in step S24, the thread for carrying out the reception processing for receiving the command from the client (the viewer 104) as the connection processing and registers the client. Then, the processing returns to step S22.

In the thread generated in this way, the corresponding command from the client (the viewer 104) is received in step S27 and the command is delivered to the main program which carries out the operation of the camera unit. The main program receives the command in step S22. In a case where the command is the manipulation command for the camera unit 1014, the processing proceeds to step S25, in which the camera unit 1014 is operated based on the request. The main program then transmits the result of the operation (the code indicating if the operation is successful or not and the like) to the thread which received the request of operation of the camera unit (step S26). The thread dealing the client notifies the viewer 104 of the state of the processing of the manipulation command for the camera unit in step S28; and in step S29, the thread dealing the client notifies the viewer 104 of the variance in the state of the control of the camera unit. Note that while the camera is being operated in step S25, the video taken by the camera unit 1014 is being transmitted to the viewer 104 (client) by the video server 502.

Note that in step S26, the main program transmits the thread dealing all the clients the state changed due to the operation of the camera unit (for example, the setting value of panning, tilting, zooming, or the like). Accordingly, the thread dealing each of the clients notifies each client (viewer) of the change in the state of control of the camera unit 1014 in step S29. In addition, if the thread dealing the client receives the command of end of connection from the client, the information to that effect is notified to the main program; and further, in step S30, the thread itself is ended.

Note that the handling of the manipulation command of the camera unit 1014 may be such that an assignment request of a camera control right is executed before a specific manipulation command is issued. Accordingly, it is possible to eliminate a confusion under a state where a plurality of persons requests the operation of one single camera unit 1014.

In this case, first, the request command is issued from the viewer 104 to the camera server 101 to the effect that the viewer desires to obtain the operation right of the camera unit 1014. In response to this, the camera control server 501 selects to reject, appoint, wait, and the like from among the appointment state for the current camera control right; and reply to the client. The viewer 104 can issue the manipulation command for operating the camera unit 1014 only within a time period from the obtainment of the camera control right and the deprivation of the camera control right. In addition, the camera control server 501 accepts only the manipulation command issued from the client having the camera control right.

As one of the characteristic features of the first embodiment, the notification to each of the clients in step S29 includes camera control capability information (description on the camera control capability) which is determined by reflecting the network status information (reception information) sent from each client. In the first embodiment, the determination of the camera control capability information is carried out on the basis of the criteria as described below.

(Criteria of Determination of Network Status in this Embodiment)

(1) If the delay (rtt) is two seconds or more, it is determined that the network status is poor.

(2) If the average jitter is 0.5 seconds or more, it is determined that the network status is poor.

With regard to the camera server 101, the camera control capability information in a case where it is determined that it is preferable to carry out the coarse granularity camera control because of poor network status as a result of determination on the network status does not include the primitive camera control which leads to relatively large amount of the output of the control command from the client (viewer) side. Alternatively, the camera control capability information describing the "preset selection", the "preset patrol", the "autopan", and the "whole view field scan" mentioned above, which reduces the output of the control command from the viewer side, is notified to the client. In contrast, when the network status is improved, the camera control capability information including the primitive camera control such as the panning, tilting, and zooming is indicated. Note that with regard to the time stamp used to grasping the network status in the first embodiment, the camera server and each of the clients are brought into synchronization by using a network time protocol (NTP).

Figure 10:
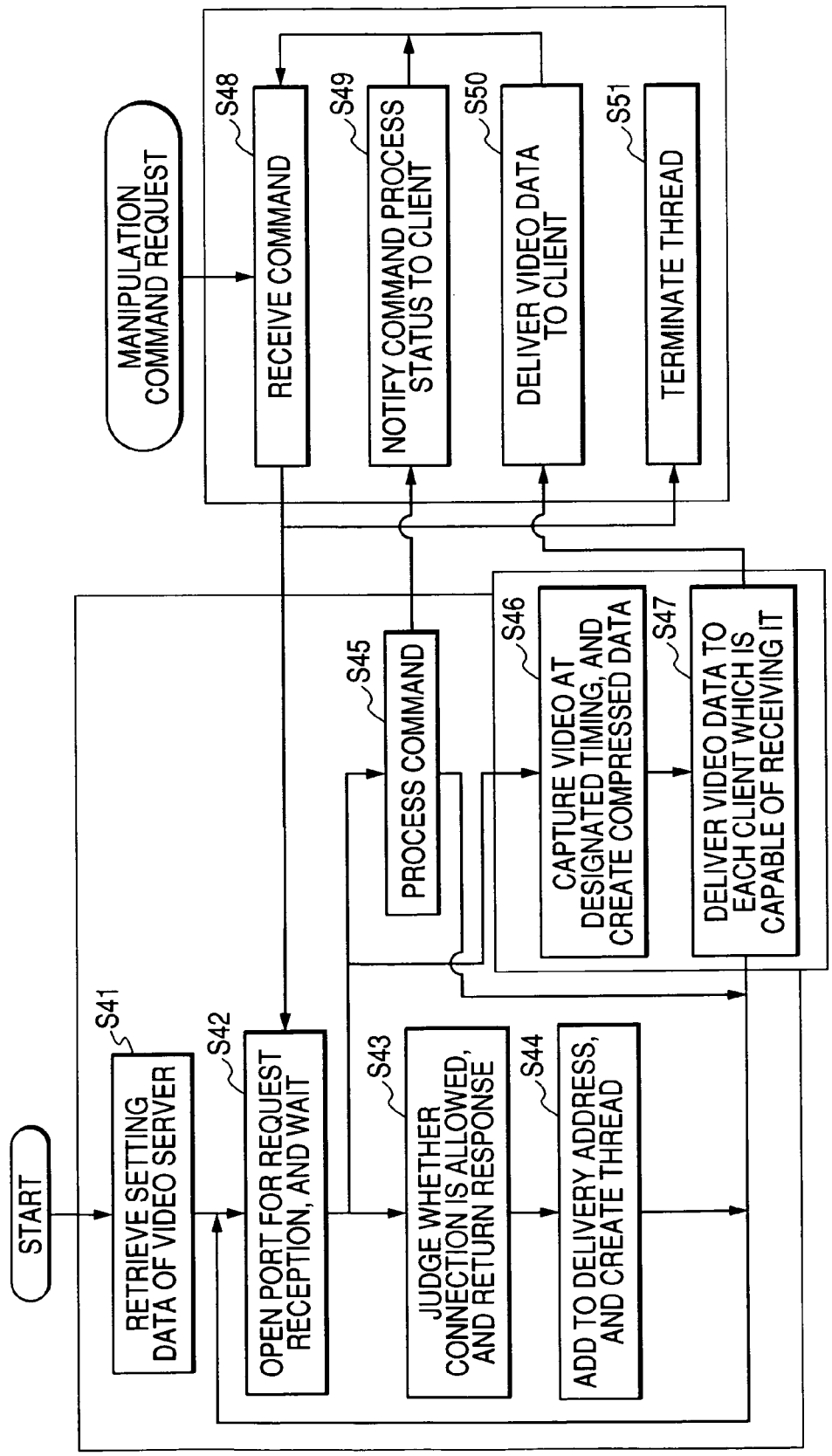
FIG. 10 is a flow chart explaining an operation of a video server of the camera server according to this embodiment.

FIG. 10 is a flow chart explaining the operation of the video server 502 of the camera server 101 according to the first embodiment.

The video server 502, first, at the time of activation thereof in step S41, retrieves the function setting information of the video server 502 from the specific file (the system database such as the registry and the like, depending on the kind of OS); and then starts the operation on the basis thereof. At this time, the thread for obtaining and encoding the video is generated (the thread is first in the suspension state); and the port for receiving the request from the viewer 104 which is the client is opened.

After that, in step S42, the video server 502 enters a request reception state. When the video server 502 receives the request (the connection request or the command request), the processing ends step S42. If the request is the connection request, the processing proceeds to step S43, in which it is determined whether the connection is available or not.

If the connection is not available, an error code to the effect that the connection is rejected is returned and the processing returns to step S42. On the other hand, if the connection is available, in step S43, the video server 502 generates the thread for carrying out the reception processing of the command from the client (the viewer 104) as the connection processing and registers the client. If the thread for obtaining and encoding the video is in the suspension state, the video server 502 instructs the thread to start the operation and the processing returns to step S42.

The thread dealing the client which is generated in the above-mentioned manner is capable of receiving the command from the dealing client and receives the command when the command reaches thereto in step S48. The thread dealing the client then delivers the received command to the main program which carries out the video processing. The main program receives the delivered command in step S42. In a case where the command is the manipulation command, the processing proceeds to step S45, in which changing operation is performed for the settings related to obtainment, encoding, and transmission of the image, and the main program transmits the result of the operation (the code indicating whether the operation is successful or not) to the thread dealing the client which receives the command request. As a result, the thread dealing the client sends back the result of the operation to the viewer 104 in step S49.

In a main program portion, an instruction is issued to the effect that the operation of the thread which obtains the video in step S44 and performs encoding is started; and in step S46, the video data is captured at a preset time interval by using the video capture board 305, and the obtained video data is encoded and compressed. Further, the compressed data is transmitted to the receivable thread dealing the client (step S47). Accordingly, in step S50, each of the threads dealing the client determines whether or not a request for transmission of a next video frame from the viewer is present. If the request is present, each of the threads dealing the client, upon request by the viewer, delivers the compressed data to the viewer (client).

When receiving the request for transmission of the next video frame from the client (this request is, generally, sent back in response to a completion of reception of the compressed video data by the client viewer), the thread dealing the client sets a flag for requesting the transmission of the video frame.

In addition, when receiving a connection end command, the thread dealing the client issues a notification to that effect, and the thread itself is ended in step S51.

Figure 11:
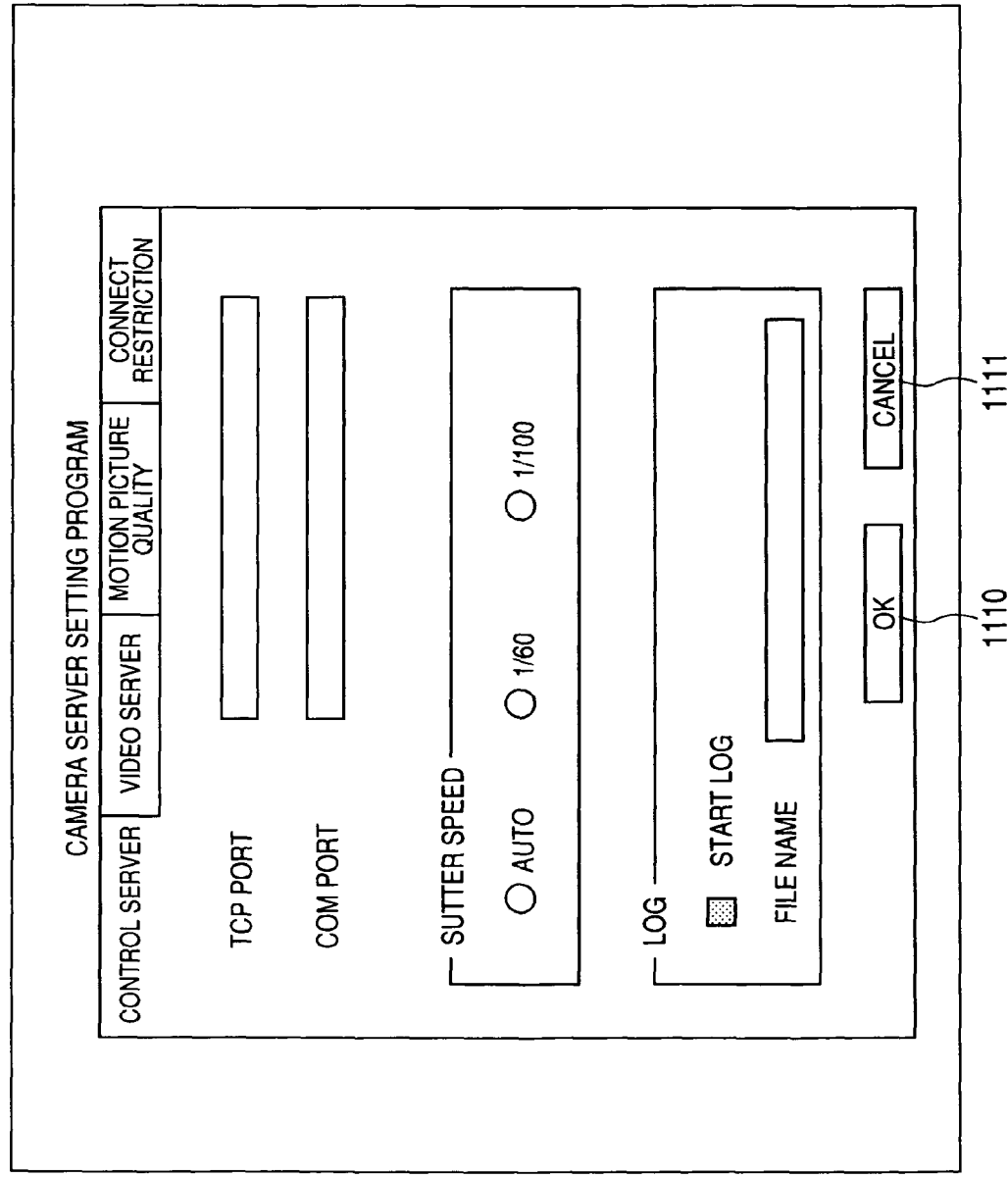
FIG. 11 is a view showing an example of a display screen of a camera server setting program which sets a setting value used by the camera server according to a first embodiment.

FIG. 11 is a view showing an example of a display screen of a camera server for setting program which sets the setting value used by the camera server 101, that is, function setting information retrieved by the camera control server 501 and the video server 502 in step S41 (FIG. 10), to a specific file (the system database such as the registry and the like, depending on the kind of the OS).

It is possible to set various kinds of parameters (to be described later) related to the camera control server 501, the video server 502, a quality of a moving screen, a connection restriction matters, and the like, by using the screen. When an OK button 1110 is pressed, the set value is written in a specific file or a registry. When the cancel button 1111 is pointed, the processing is ended without the set value being written. In the example as shown in FIG. 11, it can be recognized that for the setting in the camera control server 501, a TCP port, a COM port, a shutter speed, whether a log is taken or not, and a log file name when the log is taken can be designated. The OK button 1110 is a button for making an instruction for writing updated internal data into a specific file storing the setting information related to the camera control server 501 and the video server 502. The cancel button 1111 is a button for making an instruction for not registering the setting processing up to that time and ending the processing as it is.

Figure 12:
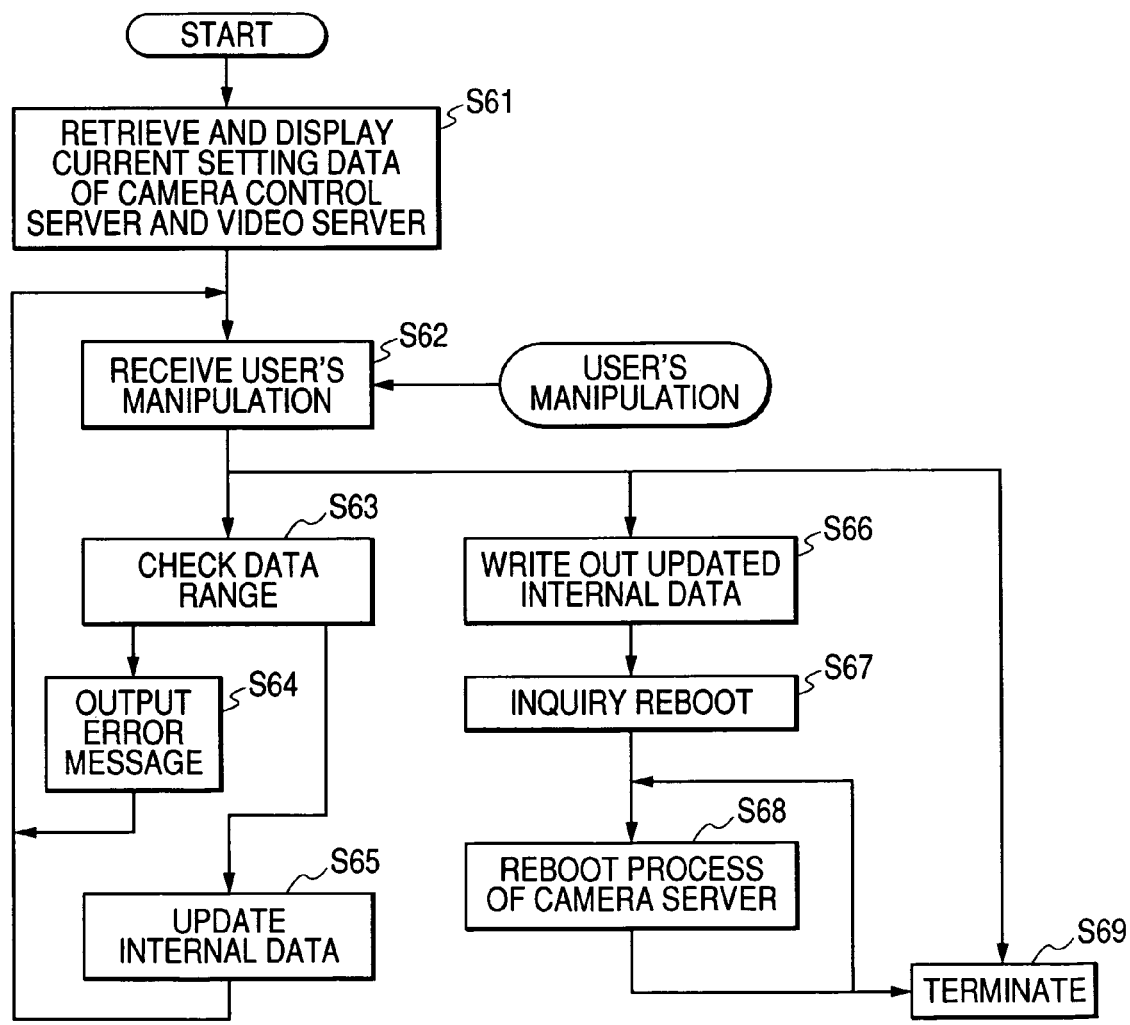
FIG. 12 is a flow chart explaining an operation on the basis of the setting program of the camera server according to the first embodiment of the present invention.

FIG. 12 is a flow chart explaining an operation of the CPU 301 executed on the basis of the setting program of the camera server 101.

The CPU 301, at the time of the actuation, in step S61, reads the setting information from the specific file (the system database such as the registry and the like, depending on the kind of OS) storing the setting information related to the camera control server 501 and the video server 502, and sets the setting information as the internal data (temporarily stored in the memory 302). After that, a loop for receiving an operation input by the user using the screen as shown in FIG. 11 and executing the operation is repeated.

In step S62, the CPU 301 waits for the manipulation input by the user, and when the input is made, receives the input. After that, in step S63, the CPU 301 judges whether or not the inputted value is within a range which can be set up or is a value which can be set up, and if the inputted value is not within the range or the value which can be set up in step S63, outputs an error message in step S64 and returns the values. Then, the processing returns to step S61 for waiting for the user to input. If the inputted value is within a range which can be set up or is a value which can be set up, the internal data in the memory 302 is updated to the inputted value in step S65, and then the processing returns to step S62.

Note that the values which can be set up here include the items as described below.

That is, the values includes: a TCP port number for communication for camera control; the COM (serial) port for connecting with the camera; the shutter speed; presence or absence of the log information related to the camera control and the log file name (refer to FIG. 11); the TCP port number for communication related to video; the presence or absence of the log information and the log file name; a Q-factor for defining a frame rate specifying a time interval for capturing the video and a quality of compression; a screen size of the original data of compressed data; maximum connection time of one client viewer; a number of persons waiting for a control right related to the camera control; holding and occupation time of the control right of one viewer; and a maximum client number that is connectible relating to the video and the camera control. Besides, a threshold value of the network status when the granularity of the camera control as explained in this embodiment is switched is set here.

In the screen as shown in FIG. 11, when the OK button 1110 is pointed by the user, the processing proceeds from step S62 to step S66. In step S66, the updated internal data is written into a the specific file and the like storing the setting information related to the camera control server 501 and the video server 502. Next, in step S67, a message inquiring as to whether the camera server 101 is restarted or not in order to reflect the changes is displayed. If the camera server 101 is to be restarted, in step S68, the camera control server 501, the video server 502, and the like are restarted and the setting program is ended in step S69. If the camera server 101 is not to be restarted, the processing proceeds directly from step S67 to step S69, and then the processing is ended. In addition, if the input by the user is made through the cancel button 1111 in step S62, the processing directly proceeds to step S69 from step S62, and the processing is ended.

With the above configuration, it is possible to switch a camera control capability provided by the camera server 101 in the camera server 101 disposed on the network 110, in accordance with the network status. Especially, in this embodiment, the camera server 101 keeps a track of the status of the communication with the viewer 104 and dynamically switches the camera control capability on the basis of the status of the communication with the viewer 104. In addition, this embodiment is characterized in that the camera server 101 is provided with extend camera control means which enables the camera control of a large granularity and that when the status of the network 110 is deteriorated, for example, the user interface of the coarse granularity camera control is provided instead of the fine granularity camera control.

In the first embodiment, in step S8 of FIG. 6, the CPU 401 observes the status of the network 110 by means of a video reception status appended to the command. However, the configuration for observing the network status is not limited to this. For example, just as the receiver report in the RTP communication, it can be easily conceived of to always notify the sender server of the network status observed by the client, which includes a number of packet losses, delay, and jitter.

In the first embodiment, for the coarse granularity camera control, a combined camera control such as the "preset patrol", the "autopan", and the "whole view field scan" by automatic generation of the camera control command are explained. However, the coarse granularity camera control is not limited to this. For example, a camera control sequence designated by the user which is created by the user (the person who installs or uses the camera) by combining the primitive control commands may also be used. In the same way, it is possible to implement the coarse granularity camera control by instructing the autonomous camera control by the camera server such as a designation of a tracking object data of a tracking operation and a designation of an automatic moving member tracking.

Also, in the same way, it is possible to implement the coarse granularity camera control by carrying out the camera control such that the user specifies one point of the video display screen by pointing (clicking) the point to make the coordinates of the point becomes the center of the video (screen coordinates specification centering).

In the first embodiment, for the description level of the camera control capability, the two levels, namely, the fine granularity camera control and the coarse granularity camera control are explained. However, the switching of the camera control is not limited to these two stages. For example, a level of an autonomous camera control by the camera server 101 such as a designation of a tracking object data of an automatic tracking function can be added to the description level of the camera control capability of this embodiment.

Besides, it is possible to present a multi-stage camera control capability description for each of the levels of the granularity in a stepwise manner to the client. For example, it is possible to present the descriptions as described below.
(Granularity) (Camera Control Description)
1: Primitive camera control (panning, tilting, zooming, and the like)
2: Preset selection operation and screen coordinates specification centering
3: Tracking object data designation operation
4: "Preset patrol" operation, "autopan" operation, and "whole view field scan" operation
5: Automatic moving member tracking setting operation In addition, a different camera control level may be provided in accordance with a kind or the setting of the user or the client. For example, even when the camera control capability of a normal viewer is set to be the coarse granularity from the observation of the network status, the fine granularity camera control capability may be provided continuously for a privileged viewer and an accumulative client.

Besides, in the first embodiment, the camera control capability is switched by notifying the description of the camera control capability from the camera server 101 to the viewer 104 (client). However, the switching of the camera control capability may be implemented by rejecting or ignoring the camera control other than the camera control permitted by the camera server 101. In contrast, the camera control capability may be switched by the viewer 104 by observing the time stamp appended to the video received from the camera server 101 and by determining the network status by computing the delay and the jitter. Further, it can be explained in the same way that the viewer 104 switches the camera control capability by making an inquiry to the camera server 101 without waiting for the notification of the camera control capability description from the camera server 101.

In addition, it is possible that the camera control capability is switched by the viewer 104 or the camera server 101 by inquiring the network status (including not only the information related to the delay and the jitter but also the information which cannot be recognized only by end-use devices such as the status of congestion and the like) which is grasped by the router and a switch on a network route or a base station and an AP (access point) and by recognizing the network status.

In this embodiment, the example is explained in which the network status between each of the clients is grasped by observing a status of distribution of the video to each of the clients to switch the camera control capability for each client. However, it is easily conceivable to switch the camera control capability of the entire camera server after grasping the network status.

In this case, a method of assigning the camera control right can be simplified. In contrast, in a case where a different camera control capability is presented for each of the clients, the method of assigning the camera control right for each of the clients may be changed in accordance with the granularity of the presented camera control capability. For example, an overhead related to the assignment of the control right may be alleviated by preferentially assigning the camera control right for the client which presents the coarse granularity camera control capability only.

In the first embodiment, the example is explained in which time information which the camera server 101 and the viewer 104 refer to is synchronized by the network time protocol (NTP). However, the time synchronization between the camera server 101 and the viewer 104 is not limited to this. For example, it is possible to obtain an equivalent effect by a method in which a time difference retained between the camera server 101 and the viewer 104 is grasped in advance as a part of a negotiation at the time of connection.

In the first embodiment, the explanation is made with the example in which the primitive camera control capability is restricted and only a limited operation component is displayed with the viewer in a case where the coarse granularity camera control capability is presented to be a display example, as shown in FIG. 8. However, the display method is not limited to this. For example, the operation component (such as a scroll bar) for carrying out the limited operation such as panning, tilting, and zooming as shown in FIG. 7 may be displayed in a disabled state.

In the first embodiment, the example is explained in which the change in the network status is reflected to the coarse granularity camera control immediately after the change in the network status is detected, in order to simplify the explanation. However, the timing of reflecting the change in the network status to the camera control is not limited to this. That is, it is possible to suppress the frequent change in the display of the viewer by delaying the application of the coarse granularity camera control (lazy evaluation) to the viewer 104. The timing at which the change in the network status is reflected to the camera control may be the time at which the camera control capability is presented by the network camera or may be the time at which the change in the network status is reflected for the display of the network status by the viewer 104.

Second Embodiment (An Example Where the Network Status is Reflected for Connection Negotiation Capability Exchange)

In the second embodiment of the present invention, as in the first embodiment described above, an example is explained in which in the camera server 101 disposed in the network 110, the camera control capability provided by the camera server 101 is switched in accordance with the status of the network 110. Especially, in the second embodiment, a capability exchange reflecting the network status is carried out at the time of the negotiation for connection from the viewer 104 to the camera server 101.

A form of connection of the network, a hardware configuration of each server and each client, and most of operations of each software according to the second embodiment are as explained in the first embodiment described above. However, a part of the operations of the viewer 104 as shown in the flow chart of FIG. 6 and a part of the operations of the camera control server 501 as shown in the flow chart of FIG. 9 are different from those explained in the first embodiment described above.

In the second embodiment, the viewer (client) 104 operates as described below.

The viewer (client) 104 according to the second embodiment, when connected to the camera control server 501 in step S6 of FIG. 6, further carries out the capability exchange of the camera control capability. In other words, a capability for issuing the camera control command which the viewer (client) 104 is provided with is listed in an XML format and the like and is transmitted to the camera control server 501; and in response to this, the camera control server 501 receives the list of the capability for receiving the receivable camera control command. Then, within the receiving capability list of the camera control command received here, the camera control command is issued in step S8 thereafter.

In addition, the viewer 104 changes the display (GUI) for itself in accordance with the received receiving capability of the camera control command. For example, the example of this is shown in FIG. 8. In the same way, in the second embodiment, the camera control server 501 operates as described below.

The camera control server 501 according to the second embodiment, when the processing of connection from the viewer 104 is carried out in step S24 of FIG. 9, further carries out the capability exchange by transmitting the camera control capability to the viewer 104. In other words, the camera control server 501 receives the list of the capability for issuing the camera control command from the viewer 104, and the camera control server 501 responds with the list of the receiving capability of the camera control command which the camera control server 501 accepts. At this time, the camera control server 501 does not merely present to the viewer 104 all the receiving capabilities of the camera control command that the camera control server 501 can accept.

The camera control server 501 according to the second embodiment edits the receiving capability of the camera control command by reflecting the network status in the communication from the viewer 104 for requesting connection and presents to the viewer 104 the edited receiving capability. More specifically, when the network status is good, the camera control server 501 presents the primitive camera control command. However, when the network status is not good, the camera control server 501 presents the coarse granularity camera control command only.

With the above configuration, in the camera server 101 disposed on the network 110, it is possible to switch a camera control capability provided by the camera server 101 in accordance with the status of the network 110. Especially, the second embodiment is characterized in that the camera server 101 grasps the status of the communication with the viewer 104 at the time of negotiation for connection and switches the camera control capability on the basis of the status of the communication with the viewer 104. In addition, just as the first embodiment described above, the camera server 101 provides the coarse granularity camera control instead of the fine granularity camera control in accordance with the network status.

In the second embodiment, the example is explained where at the time of negotiation for connection, the network status is observed, the camera control capability is exchanged, and the granularity of the camera control is changed in accordance with the network status. However, the cause for changing the granularity of the camera control is not limited to the network status.

For example, it is possible to change the granularity of the camera control in accordance with the kind and the setting of the device as the viewer 104. For example, for the viewer implemented in a PC in which a delicate operation can be performed by the mouse and the like, the capability of the primitive camera control command is presented. On the other hand, for the viewer of a terminal of a cellular phone which is lower in operability than the above-mentioned viewer or for the viewer on a network TV, the description of the coarse granularity camera control capability is presented in advance.

Besides, it is possible to change the granularity of the camera control in accordance with the status of the camera server 101. For example, it is possible to present the description of the coarse granularity camera control capability if a machine load of the camera server 101 and a number of the clients connected the camera server 101 exceed a previously set threshold value.

Third Embodiment (An Example of Operation Interface for Reflecting the Network Status in a Stepwise Manner)

In the third embodiment, just as described in the first embodiment, an explanation is made as to an example where in the camera server 101 disposed on the network 110, the camera control capability provided by the camera server 101 is switched in accordance with the network status such as the communication delay and the communication jitter.

Especially, the third embodiment is characterized in that the operation interface (GUI) which the viewer 104 provides changes from the fine granularity camera control to the coarse granularity camera control in a stepwise manner by the capability exchange reflecting the network status.

In the third embodiment, a form of connection of the network, a hardware configuration, and most of the operations of each software are as explained in the first embodiment. However, a part of the operations of the viewer 104 as shown in FIG. 6 and a part of the operation interfaces of the viewer as shown in FIG. 7 and FIG. 8 are different from those explained in the first embodiment described above.

In the third embodiment, the operation interface of the viewer 104 changes in a stepwise manner as described below. The change in the operation interface is reversible.

In other words, as a result of determination of the communication status of the network 110, if it is determined that it is better to carry out the coarse granularity camera control due to the deterioration of the network status, the operation interface of the viewer 104 changes in a stepwise manner from an "operation interface 1" to an "operation interface 2", an "operation interface 3", and then to an "operation interface 4". In contrast, when the network status is improved and it is determined that it is appropriate to carry out the fine granularity camera control, the operation interface of the viewer 104 changes in a stepwise manner from an "operation interface 4" to an "operation interface 3", an "operation interface 2", and then to an "operation interface 1".

The display of the viewer (update of an internal status) in step S10 (FIG. 6) and the issuance of the command in step S8 in the third embodiment reflect the description of the camera control capability in accordance with the network status for the display of the operation interface and the issuance of the command of the viewer 104. Hereinafter, the "operation interface 1" through "operation interface 4" mentioned above are explained.

"Operation Interface 1"

The "operation interface 1" is the normal operation interface of the viewer (FIG. 7). The "operation interface 1" makes it possible to issue the command of the primitive camera control such as panning, tilting, and zooming. The preset select portion performs the camera control to the set value of panning, tilting, and zooming by selecting preset items previously set for the network camera.

"Operation Interface 2"

Figure 13:
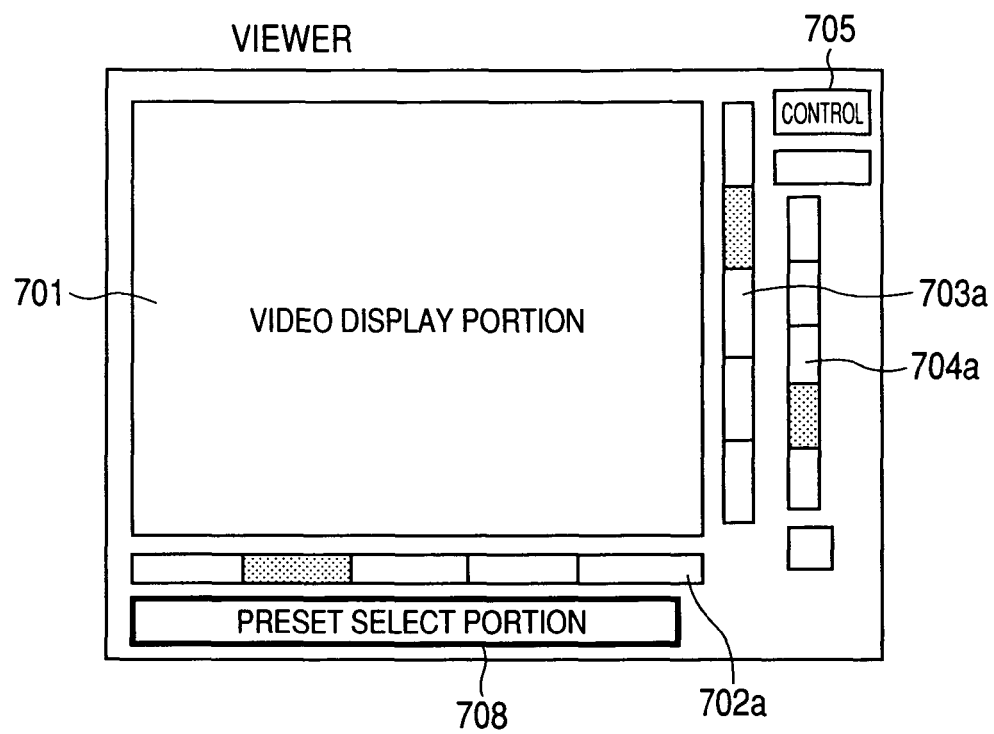
FIG. 13 is a view showing an example of a UI screen (operation interface 2) in the viewer according to a third embodiment of the present invention.

The "operation interface 2" is similar to the "operation interface 1", however, for the "operation interface 2", an example in which steps of a slider bar of panning, tilting, zooming, and the like are coarsely provided and a discontinuous (stepwise) value can be set (FIG. 13). In the example as shown in FIG. 13, each of the scroll bars 702a through 704a can be set in five stages each, and is provided with the operation button for panning, tilting, and zooming capable of issuing the command in a stepwise manner. The preset select portion 708 is the same as that of the "operation interface 1".

"Operation Interface 3"

Figure 14:
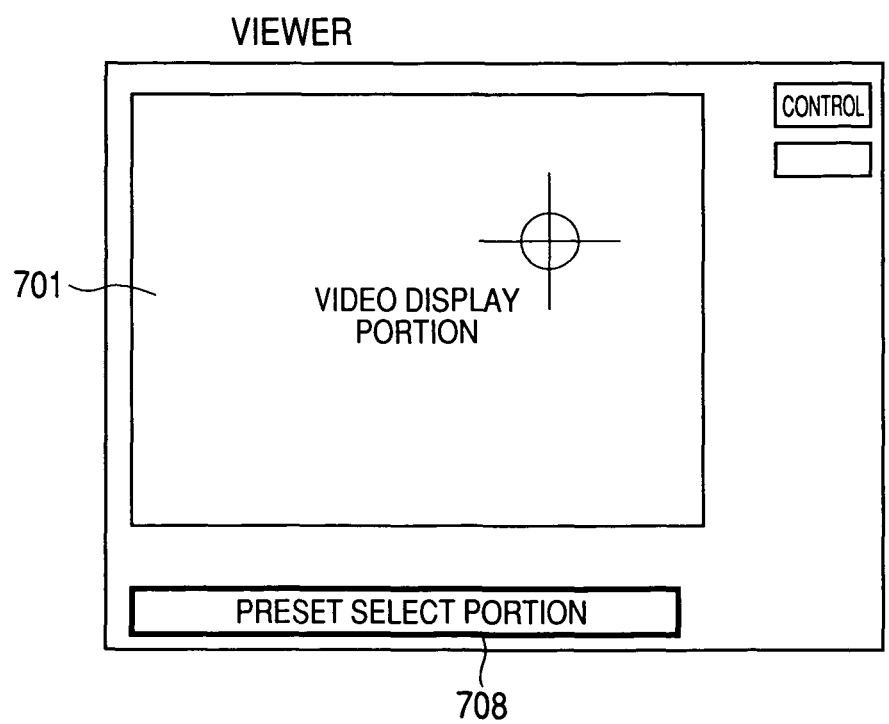
FIG. 14 is a view showing an example of a UI screen (operation interface 3) in the viewer according to the third embodiment of the present invention.

The "operation interface 3" is similar to the "operation interface 2", however, the "operation Interface 3" is not provided with the slider bar as shown in FIG. 13 (FIG. 14). In this case, by clicking a position on the video display portion 701 with the mouse 1043, it is possible to issue the command of only the panning and tilting operation in a designated direction. The preset select portion 708 is the same as that of the "operation interface 1".

"Operation Interface 4"

Figure 15:
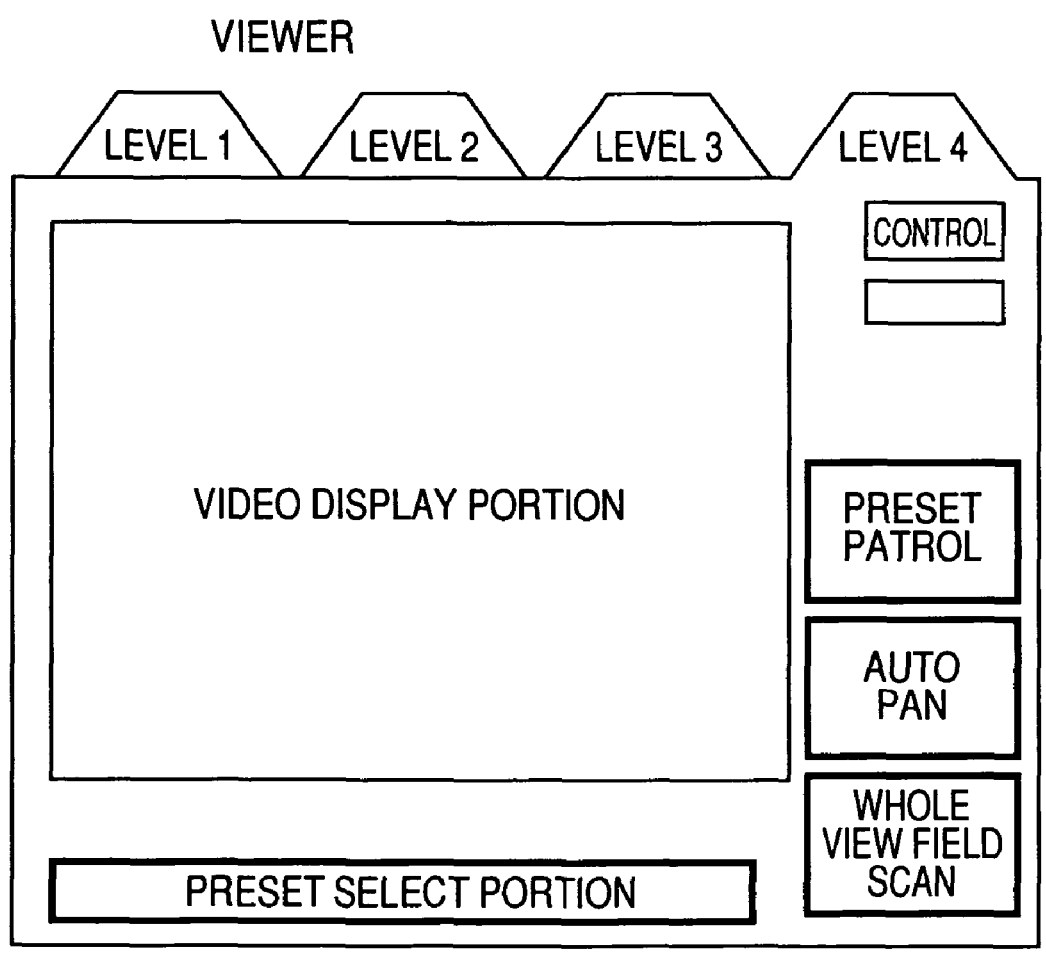
FIG. 15 is a view showing an example of a UI screen (operation interface 4 having a display with tabs) in the viewer according to the third embodiment of the present invention.

The "operation interface 4" is the operation interface which does not include the primitive camera control (FIG. 8). Instead, it is possible to issue the command of the "preset selection", the "preset patrol", the "autopan", and the "whole view field scan". For example, in a case where the network camera which is a connection destination obtains the video of an image pickup range panned to a rightmost end in the "operation interface 2", the button at the rightmost end within the scroll bar (button) rows in the direction of panning positioned between the video display portion 701 and the preset select portion 708 is operated after the camera control right is obtained by pointing the camera control right obtaining button 705. Note that the change in the operation interface may be notified to the user by means of the display with tabs (FIG. 15). In the display with tabs as shown in FIG. 15, the levels 1 through 4 of the label description of the tabs correspond to the "operation interface 1" through "operation interface 4" respectively. In the example as shown in FIG. 15, the "operation interface 4" corresponding to the level 4 is selected.

With the above configuration, in the camera server 101 disposed on the network 110, it is possible to switch the camera operation control capability provided by the camera server 101 in a stepwise manner in accordance with the status of the network 110.

In addition, in the third embodiment, the display of the scroll bars are changed in five stages and the operation interface is changed in four stages. However, a number of the stages is not limited to this embodiment and may be increased or decreased.

Besides, in the third embodiment, the change in the operation interface is notified to the user with the display with tabs. However, a form of display is not limited to this. For example, an "operation interface number" may be displayed at any position on the screen, or rather, the change in the operation interface may be notified to the user by a voice message. It is also possible not to provide notification means for explicitly notifying the user of the change in the operation interface.

In the third embodiment, the example is explained where the camera of the camera server 101 is controlled after the control right is explicitly obtained. However, if the coarse granularity operation interface is applied, the camera server 101 may carry out an automatic obtainment and an automatic release of the camera control right. For example, if the viewer 104 retains the control right at the time the coarse operation interface is shifted, the camera server 101 automatically releases the control right. In addition, the camera server 101, in issuing the coarse granularity camera control command, executes the camera control command after automatically providing the client with the control right without obtaining the explicit camera control right. Further, if the control right is released by shifting to the coarse granularity operation interface, the camera server 101 may compensate by providing a reservation right of the control right. The reservation right of the control right is the right to preferentially obtain the control right when the camera control right is automatically obtained.

Fourth Embodiment (An Example Where the Coarse Granularity Operation Interface is Implemented with the Operation Interface of a Cellular Phone)

In the fourth embodiment, the operation interface provided by the viewer implemented on the cellular phone terminal changes from the fine granularity camera control to the coarse granularity camera control or vice versa by the capability exchange reflecting the network status.

In the fourth embodiment, a form of connection of the network and the hardware configuration, and most of operations of each software are as explained in the first embodiment described above. However, a hardware configuration of the viewer 104, a part of the operations of the viewer 104 as shown in FIG. 6, and a part of the operation interfaces of the viewer as shown in FIGS. 7 and 8 are different from those of the first embodiment.

Figure 16:
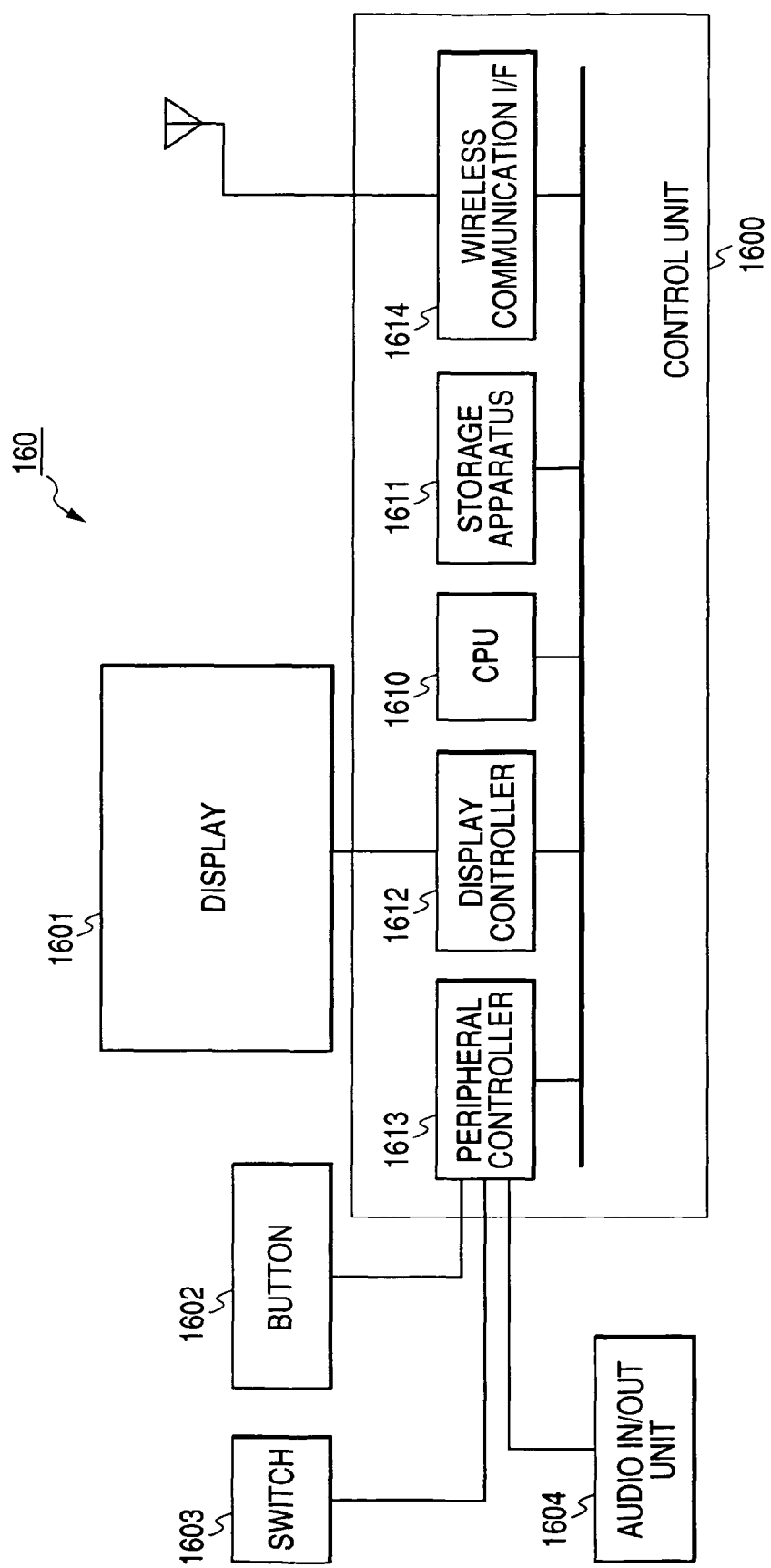
FIG. 16 is a block diagram showing a hardware configuration of a viewer (cellular phone terminal) as a client according to a fourth embodiment of the present invention.

FIG. 16 is a block diagram showing a hardware configuration of a viewer (cellular phone terminal) 160 as the client according to the fourth embodiment of the present invention.

In FIG. 16, a control unit 1600 includes: a CPU 1610; a storage apparatus 1611 for storing programs, data, and the like executed by the CPU 1610 and sent and received data, photographic data, and the like; a display controller 1612 for controlling the display on a display section (display) 160.1; a peripheral controller 1613 for controlling buttons 1602, switches 1603, and an audio in/out unit 1604; and a wireless communication interface (I/F) 1614 for performing a telephone call by a wireless communication and sending and receiving of the data. The audio in/out unit 1604 includes a microphone and a speaker.

In a viewer 160 implemented in the cellular phone terminal, a plurality of the buttons 1602; the various kinds of switches 1603; or the audio in/out unit 1604 are used for the operation of the viewer 160. In addition, for the network communication, the wireless communication interface 1614 is used. The storage apparatus 1611 is, in most cases, configured by a volatile RAM and a non-volatile memory such as a flash memory. The software configuring the viewer 160 according to the fourth embodiment is stored in the storage apparatus 1611 and implemented by the CPU 1610.

The display of the viewer (update of an internal status) in step S10 (FIG. 6) and the issuance of the command in step S8 according to the fourth embodiment reflect the status of the network 110 for the display of the viewer 160 and the issuance of the command. In the fourth embodiment, the operation interface of the viewer 160 implemented on the cellular phone terminal changes as described below. Note that the change in the operation interface is reversible as in the embodiments described above.

Figure 17:
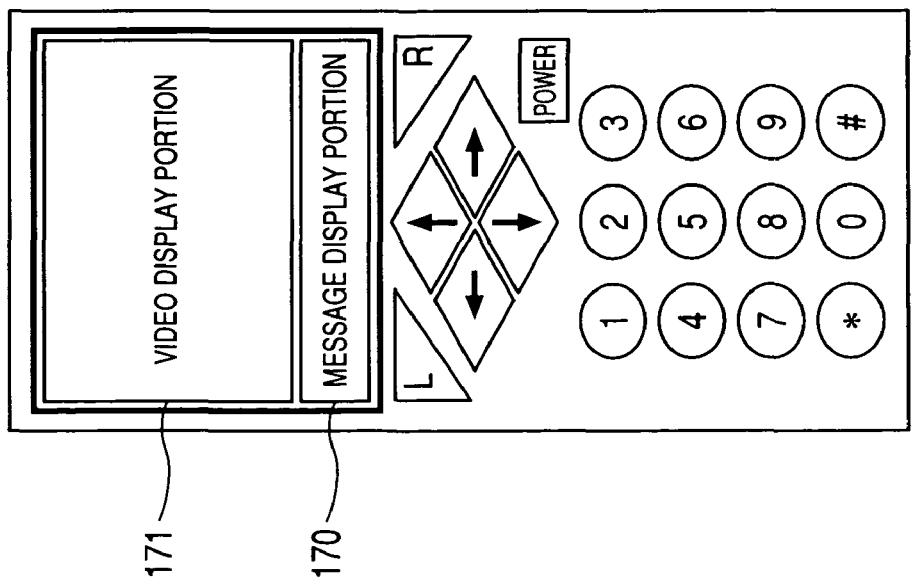
FIG. 17 is a view for explaining an operation interface in a normal state of the viewer implemented on the cellular phone terminal according to the fourth embodiment of the present invention.

FIG. 17 is a view for explaining the operation interface in a normal state of the viewer 160 implemented on the cellular phone terminal according to the fourth embodiment.

The viewer 160 of the cellular phone terminal according to the fourth embodiment is operated by the manipulation of the buttons. Here, a cursor key (arrow key) is assigned with the function of panning and tilting; a right and left key (L/R) key is assigned with the function of zooming; a numeral key is assigned with the function of "preset selection"; and the symbol keys (* and #) are assigned with the functions of request for the control right, backlight compensation, and the like. For example, if the video in the image pickup range which is positioned at the upper left of the current position is desired to be obtained by the camera server 101 which is a connection destination, the camera control of panning to the left and tilting upward is carried out by using the arrow keys ("←" key and "↑" key), after obtaining the control right with the "#" key. Note that when the control right is obtained, the message to that effect is displayed on a message display portion 170. In a video display portion 171, the video received from the camera server 101 is displayed.

Figure 18:
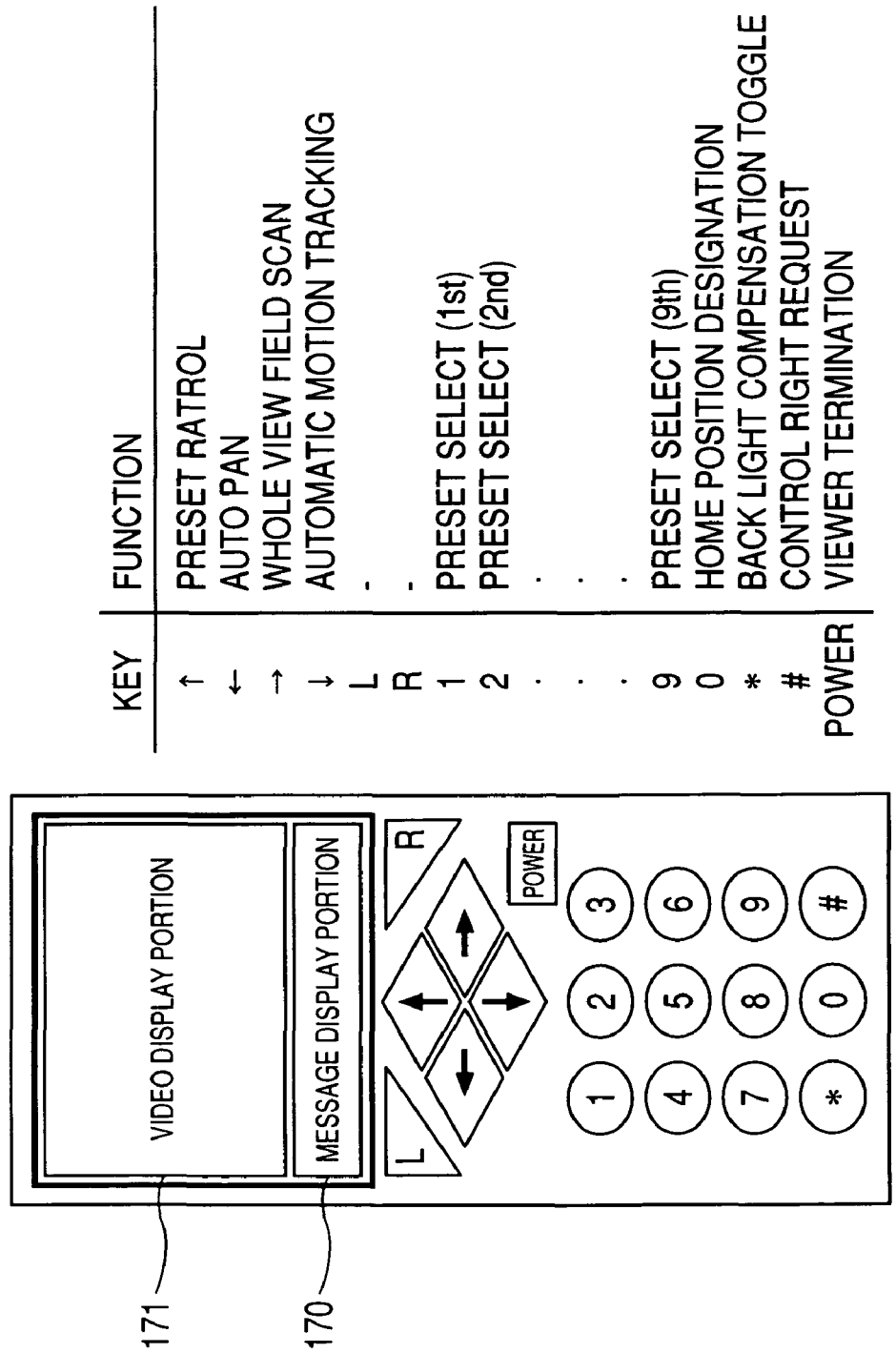
FIG. 18 is a view for explaining an operation interface in a normal state of the viewer implemented on the cellular phone terminal according to the fourth embodiment of the present invention.

FIG. 18 is a view for explaining the operation interface in a normal state of the viewer 160 implemented on the cellular phone terminal according to the fourth embodiment. Here, the operation interface of the viewer on the cellular phone terminal providing the coarse granularity operation interface by reflecting the change in the network status.

Here, the point that the numeral key is assigned with the function of "preset selection", and that the symbol keys are assigned with the functions of request for the control right, the backlight compensation, and the like is the same as the operation interface in the normal state as shown in FIG. 17 as described above. On the other hand, there is a difference in the point that the cursor keys (arrow keys) are assigned with the coarse granularity operation interfaces such as "preset patrol", "autopan", "whole view field scan", and "moving member automatic tracking". Further, in order to notify the user of the change in the operation interface, the message regarding the change is displayed on the message display portion 170. Or rather, the background color or the background pattern of the message display portion 170 may be changed.

For example, if the camera control to carry out the "preset patrol" is instructed by the camera server 101 which is the communication destination, the arrow key ("↑" key) is operated after obtaining the control right by operating the "#" key. Thereby the camera server 101 distributes to the viewer 160 the video obtained by patrolling for every predetermined period of time in the order of the set preset setting. Note that in the cellular phone and the like, with regard to a condition of switching the coarse granularity camera operation interface in the wireless communication, not only the delay, the jitter, or the frame rate, but also other causes are considered.

The change in the operation interface in the fourth embodiment occurs in a case: where a radio wave intensity received by the cellular phone terminal becomes weak; where a number of the cellular phone terminals connecting to the base station which can be accommodated exceeds the set number (for example, five users); where the base station of the connection destination is frequently changed and resident time is short; where base station is changed to the base station to which a specific attribute is designated (for example, the base station installed by a non-common carrier); and the like.

With the above configuration, in the camera server 101 disposed on the network, it is possible to switch the camera operation capability provided by the camera server 101 in accordance with the network status.

In addition, in the fourth embodiment, the example is explained in which the camera control command is immediately transmitted by the manipulation of the button. On the other hand, the coarse granularity camera control may be implemented by buffering (temporarily storing) the primitive camera control command in the cellular phone terminal. For example, first, the "#" key for requesting the control right is pointed, and next, the camera control command which is operated before the "#" key for requesting the control right is operated is retained in the viewer 160. Then, at the time when the manipulation of the latter "#" key for requesting the control command is operated, the camera control right is requested to the camera server 101. Besides, at the time when the control right is obtained, a series of the camera control commands retained by the viewer 160 is requested as a sequence of the camera control. In addition, as shown in FIG. 19, the coarse granularity camera control may be instructed via the operation of a menu instead of the immediate transmission of the camera control command by the manipulation of the buttons.

Figure 19:
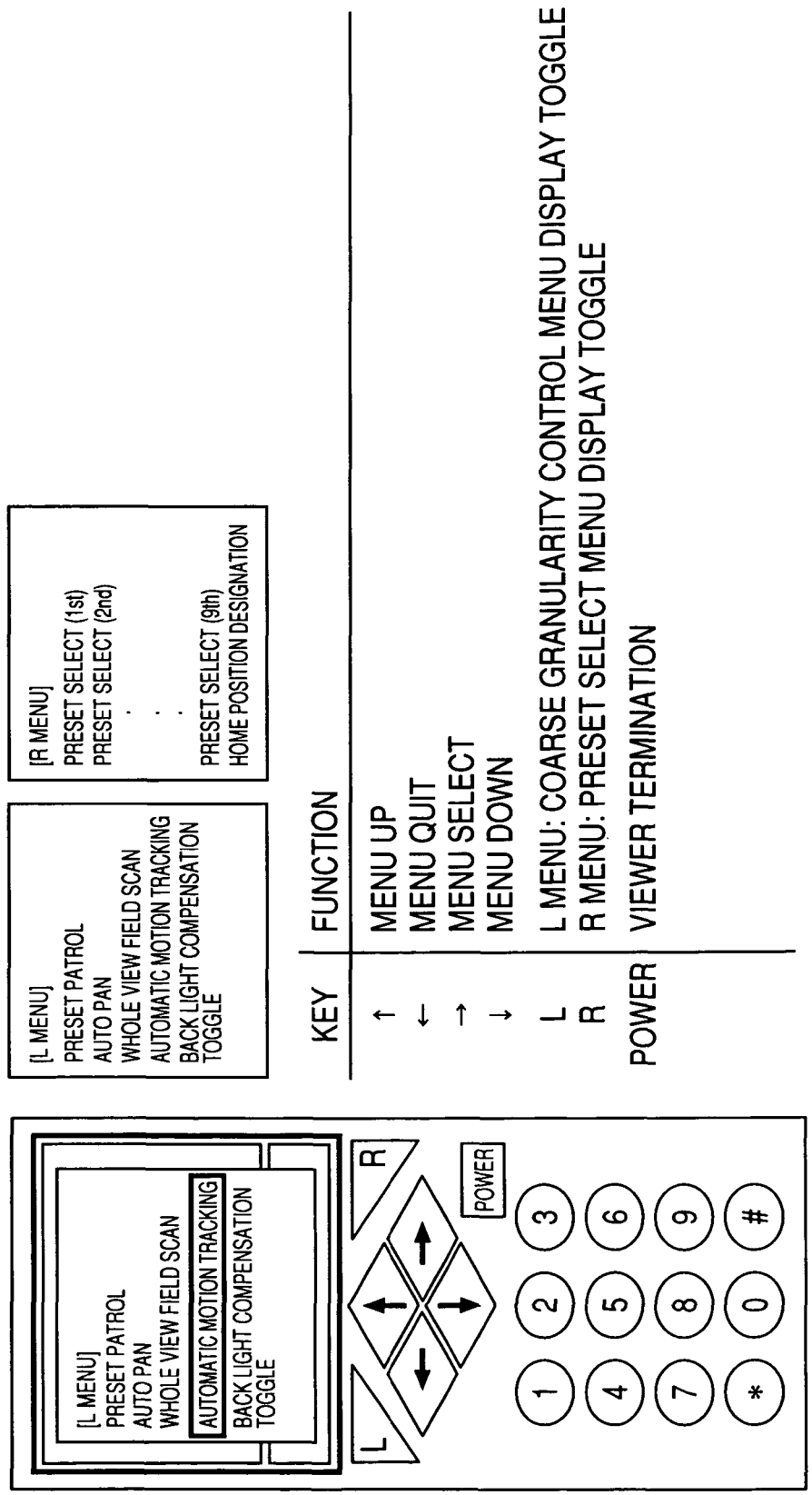
FIG. 19 is a view showing an example of an operation menu displayed in a message display portion according to the fourth embodiment of the present invention.

FIG. 19 is a view showing an example of an operation menu displayed in the message display portion according to the fourth embodiment.

Contents of the menu are displayed on the message display portion 170 of the cellular phone terminal. At this time, the menu may be switched to be displayed instead of video display and may be displayed with being superposed on the video.

In the fourth embodiment, the operation interface on the cellular phone terminal is explained. However, the operation interface may be applied for a device other than this, such as a television device. For example, the operation interface of the cellular phone terminal of the fourth embodiment may be applied for a combination of the display screen of the television device and the remote controller.

Fifth Embodiment (An Example Where an Individual Condition of the Network Status is Individually Reflected to the Coarse Granularity Operation Interface)

In the first embodiment, the change in the delay, jitter, frame rate, and the like are collectively handled as the change in the network status. However, the fifth embodiment is characterized in that the content of the change in the communication status of the network is individually evaluated to reflect the evaluation to the operation interface.

A form of connection of the network, the hardware configuration, and most of operations of each software according to the fifth embodiment are as explained in the embodiments described above. However, a part of the operations of the camera control server as shown in FIG. 9, a part of the operation of the viewer as shown in FIG. 6, and a part of the operation interfaces of the viewer as shown in FIGS. 7 and 8 are different from those of the first embodiment.

The camera control capability information (description of the camera control capability) included in the notification to each client in step S29 (FIG. 9) according to the fifth embodiment is judged in accordance with criteria as described below.

Criteria for judging the communication status of the network and the camera control capability information according to the fifth embodiment:

(1) If the delay (rtt) is two seconds or more, the operation capability of the panning, tilting, and zooming is not provided.

(2) If the average jitter is 0.5 seconds or more, the operation capability of the panning, tilting, and zooming is not provided.

(3) If the reception frame rate is 10 frames per second (fps) or less, the operation capability of the "preset patrol", the "autopan", and the "whole view field scan" is provided.

The display of the viewer (update of an internal status) in step S10 (FIG. 6) and the issuance of the command in step S8 in the fifth embodiment, as in the first embodiment, are reflected for the operation interface display of the viewer 104 and the issuance of the command in accordance with the camera control capability information provided by the camera control server 501. However, because the coarse granularity operation interface is individually applied, the operation interface of the viewer 104 is different from that of the first embodiment.

Figure 20:
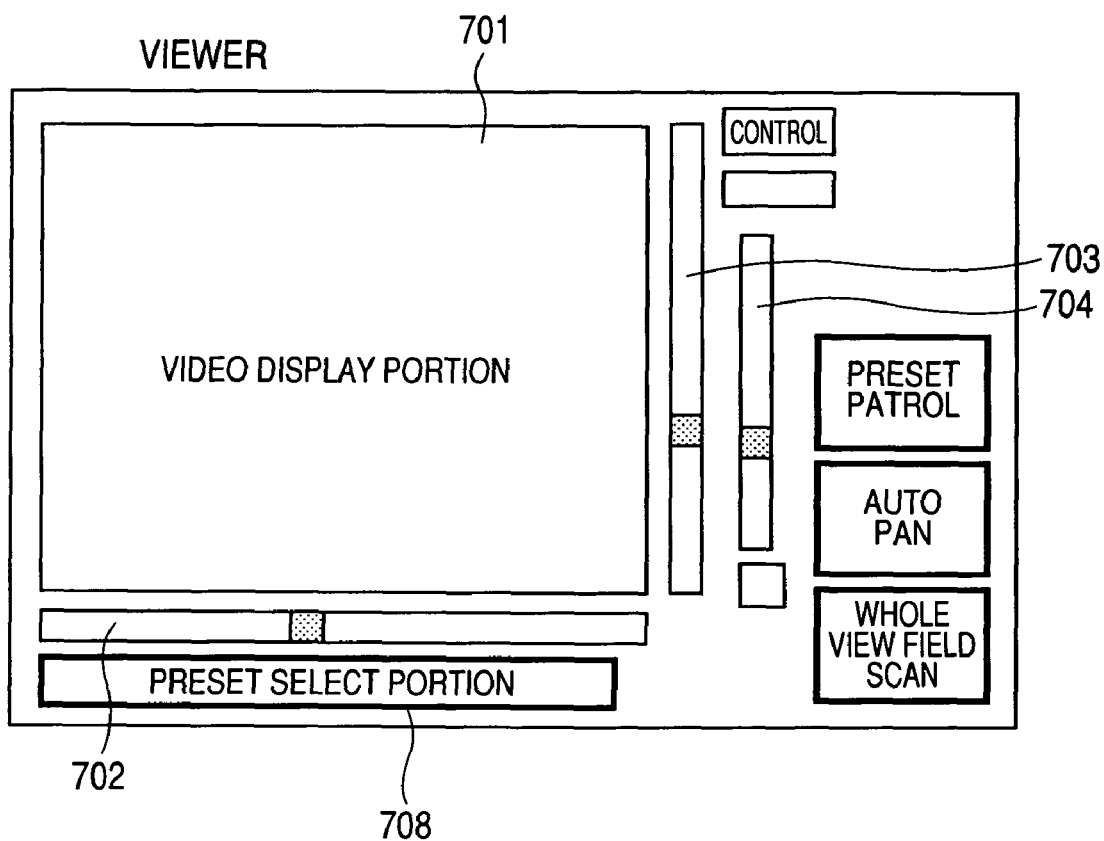
FIG. 20 is a view showing an example of a display of the viewer in a case where a frame rate is low (less than 10 fps) but there rarely occur delay and jitter in a fifth embodiment of the present invention.

FIG. 20 is a view showing an example of the display of the viewer 104 in a case where the frame rate is low (less than 10 fps) but there rarely occur delay and jitter in the fifth embodiment. Here, FIG. 20 has the configuration in which the configurations in FIGS. 7 and 8 mentioned above are combined into one configuration (both the functions of the configurations of FIGS. 7 and 8 can be instructed).

In this case, the operation capability of the panning, tilting, and zooming continues to be provided from the judgment criteria mentioned above and the operation capability of the "preset patrol", the "autopan", and the "whole view field scan" is also provided together with the operation capability of the panning, tilting, and zooming.

With the above configuration, in the camera server 101 disposed on the network, it is possible to switch operation control capability of the camera unit 1014 provided by the camera server 101 in accordance with the communication status of the network 110. Especially in the fifth embodiment, it is possible to individually evaluate the content of the change in the network status and to determine and operate the operation interface depending on the more detailed communication status.

In the fifth embodiment, the content of the change in the network status is individually evaluated. However, the object of individual evaluation in order to reflect to the operation interface is not limited to the network status. For example, the content of the change may be reflected to each of the operation interfaces on the basis of the kind of the viewer and attributes of the viewer. In the same way, the information of the camera server such as a number of the clients of the camera server 101 or the holding state holding of the camera control right may be reflected.

As is described above, according to this embodiment, in the camera server disposed on the network, it is possible to switch the camera operation capability provided by the camera server by individually evaluating the content of the change in the communication status of the network.

Other Embodiments

The aspect of the present invention can be also achieved by providing to the system or the apparatus a storage medium storing a program code of the software implementing the function of the embodiment and by reading and implementing the program code stored in the storage medium by the system or the computer (or the CPU and the MPU thereof) of the apparatus. In this case, the function of the embodiment mentioned above is implemented by the program code itself which is read from the storage medium, and the storage medium storing the program code configures the present invention. For the storage medium for supplying the program code like this, a floppy (registered trademark) disk, a hard disk, an optical disk, a magneto-optical disk, a CD-ROM, a CD-R, a magnetic tape, a non-volatile memory card, an ROM, and the like can be used.

In addition, the embodiment of the present invention includes not only a case where the function of the embodiment described above is implemented by executing the program code read by the computer, but also a case where an operating system (OS) and the like operating on the computer carries out a part of or the whole of the actual processing and the function of the embodiment described above is implemented by the processing.

Further, the embodiment of the present invention includes a case where after the program code read from the storage medium is written into a function extension board inserted in the computer or in the memory provided to a function extension unit connected to the computer, the CPU and the like provided to the function extension board and the function extension unit carry out a part of or the whole of the actual processing and the function of the embodiment mentioned above is implemented by the processing.

This application claims priority from Japanese Patent Application No. 2004-282479 filed Sep. 28, 2004, which is hereby incorporated by reference herein.

What is claimed is:

1. An image distribution system comprising: a server including an image sensing unit;
   a client device for receiving an image picked up by the image sensing unit via a network;
   control means for controlling an operation of the image sensing unit; command issue means for issuing a function request command from the client device to the control means;
   judging means for judging a communication status of the network; and
   display control means for displaying a user interface, wherein the user interface includes selectable indicators depending on a quality of the communication status of the network judged by the judging means, the selectable indicators consisting of buttons and scroll bars, allowing the function request command to be performed with a fine granularity of control commands of pan, tilt or zoom, when the quality of the communication status of the network is higher than a predetermined level, and when the quality of the communication status of the network is lower than the predetermined level, changing the user interface such that the selectable indicators for performing the function request command with a fine granularity of the control commands are no longer displayed, and instead, the selectable indicators consist of one or more buttons allowing limited pan, tilt or zoom operations with preset values determined in the server according to the communication status of the network.

2. A server for distributing to a client device an image picked up by an image sensing unit of the server via a network, the server comprising:
   a processor;
   control means for controlling an operation of the image sensing unit of the server in response to a function request command from the client device;
   judging means for judging a communication status of the network; and
   notification means for notifying the client device of information in order to display a user interface, wherein the user interface includes selectable indicators depending on a quality of the communication status of the network judged by the judging means, the selectable indicators consisting of buttons and scroll bars, allowing the function request command to be performed with a fine granularity of the control commands of pan, tilt or zoom, when the quality of the communication status of the network is higher than a predetermined level, and when the quality of the communication status of the network is lower than the predetermined level, change the user interface such that the user selectable indicators for performing the function request command with a fine granularity of the control commands are no longer displayed, and instead, the user selectable indicators, consist of one or more buttons allowing limited pan, tilt or zoom operations with preset values determined in the server according to the communication status of the network.

3. A client device for receiving an image picked up by an image sensing unit of a server via a network, the client device comprising:
   a processor;
   command issue means for issuing a function request command for controlling an operation of the image sensing unit of the server;

judging means for judging a communication status of the network; and display control means for displaying a user interface, wherein the user interface includes selectable indicators depending on a quality of the communication status of the network judged by the judging means, the selectable indicators consisting of buttons and scroll bars, allowing the function request command to be performed with a fine granularity of control commands of pan, tilt or zoom, when the quality of the communication status of the network is higher than a predetermined level, and when the quality of the communication status of the network is lower than the predetermined level, changing the user interface such that the selectable indicators for performing the function request command with a fine granularity of the control commands are no longer displayed, and instead, the selectable indicators, consist of one or more buttons allowing limited pan, tilt or zoom operations with preset values determined in the server according to the communication status of the network.

4. A server for distributing to a client device an image picked up by an image sensing unit of the server via a network, the server comprising:

a processor;

control means for controlling an operation of the image sensing unit of the server in response to a function request command from the client device;

judging means for judging a status of the client device and the server; and notification means for notifying the client device of information related to a control command in order to display a user interface, wherein the user interface includes selectable indicators depending on a quality of the communication status of the network judged by the judging means, the selectable indicators consisting of buttons and scroll bars, allowing the function request command to be performed with a fine granularity of control commands of pan, tilt or zoom, when the quality of the communication status of the network is higher than a predetermined level, and when the quality of the communication status of the network is lower than the predetermined level, changing the user interface such that the selectable indicators for performing the function request command with a fine granularity of the control commands are no longer displayed, and instead, the selectable indicators, consist of one or more buttons allowing limited pan, tilt or zoom operations with preset values determined in the server according to the communication status of the network.

5. A server according to claim 4, wherein the status of the client device includes at least one of: a kind of the client device, an access right the client device has, a number of connected client devices; and the status of the server includes a load of the server.

6. A control method for controlling, through a client device, an image sensing unit of a server via a network, comprising:

a processor executing:

a judging step of judging a communication status of the network; and a notification step of notifying the client device of information in order to display a user interface, wherein the user interface includes selectable indicators depending on a quality of the communication status of the network judged by the judging step, the selectable indicators consisting of buttons and scroll bars, allowing a function request command to be performed with a fine granularity of control commands of pan, tilt when the quality of the communication status of the network is higher than a predetermined level, and when the quality of the communication status of the network is lower than the predetermined level, change the user interface such that the selectable indicators for performing the function request command with a fine granularity of the control commands are no longer displayed, and instead, the selectable indicators, consist of one or more buttons allowing limited pan, tilt or zoom operations with preset values determined in the server according to the communication status of the network.

7. A control method for controlling, through a client device, an image sensing unit of a server via a network, comprising:

a command issue step of issuing a function request command for controlling an operation of the image sensing unit of the server;

a judging step of judging a status of the client device and the server; and a display step of displaying in a device a user interface wherein the user interface includes selectable indicators depending on a quality of the communication status of the network judged by the judging step, the selectable indicators consisting of buttons and scroll bars, allowing the function request command to be performed with a fine granularity of control commands of pan, tilt or zoom, when the quality of the communication status of the network is higher than a predetermined level, and when the quality of the communication status of the network is lower than the predetermined level, changing the user interface such that the selectable indicators for performing the function request command with a fine granularity of the control commands are no longer displayed, and instead, the selectable indicators, consist of one or more buttons allowing limited pan, tilt or zoom operations with preset values determined in the server according to the communication status of the network.

8. A non-transitory computer readable storage medium encoded with a program for executing a control method for controlling, through a client device, an image sensing unit of a server via a network, the program causing a computer to execute:

a judging step of judging a communication status of the network; and a notification step of notifying the client device of information in order to display a user interface wherein the user interface includes selectable indicators depending on a quality of the communication status of the network judged by the judging step, the selectable indicators consisting of buttons and scroll bars, allowing a function request command to be performed with a fine granularity of control commands of pan, tilt or zoom, when the quality of the communication status of the network is higher than a predetermined level, and when the quality of the communication status of the network is lower than the predetermined level, change the user interface such that the selectable indicators for performing the function request command with a fine granularity of the control commands are no longer displayed, and instead, the selectable indicators, consist of one or more buttons allowing limited pan, tilt or zoom operations with preset values determined in the server according to the communication status of the network.

9. A non-transitory computer readable storage medium encoded with a program for executing a control method for controlling, through a client device, an image sensing unit of a server via a network, the program causing a computer to execute:
- a command issue step of issuing a function request command for controlling an operation of the image sensing unit of the server;
- a judging step of judging a status of the client device and the server; and
- a display step of displaying a user interface wherein the user interface includes selectable indicators depending on a quality of the communication status of the network judged by the judging step, the selectable indicators consisting of buttons and scroll bars, allowing the function request command to be performed with a fine granularity of control commands of pan, tilt or zoom, when the quality of the communication status of the network is higher than a predetermined level, and when the quality of the communication status of the network is lower than the predetermined level, changing the user interface such that the selectable indicators for performing the function request command with a fine granularity of the control commands are no longer displayed, and instead, the selectable indicators, consist of one or more buttons allowing limited pan, tilt or zoom operations with preset values determined in the server according to the communication status of the network.

* * * * *